Feb. 1, 1938.  A. S. HEINEMAN  2,107,036
ARTICLE DIVIDING AND PACKAGING MACHINE
Original Filed Jan. 2, 1935  23 Sheets—Sheet 1

Inventor
Arthur S. Heineman
By Lyon & Lyon
Attorneys

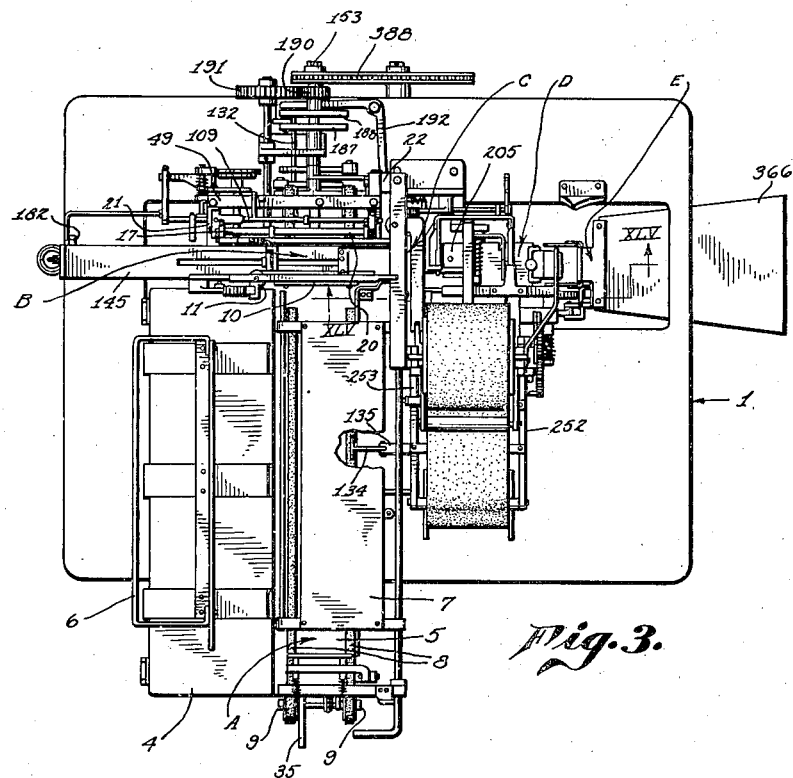

Feb. 1, 1938.  A. S. HEINEMAN  2,107,036
ARTICLE DIVIDING AND PACKAGING MACHINE
Original Filed Jan. 2, 1935   23 Sheets-Sheet 4
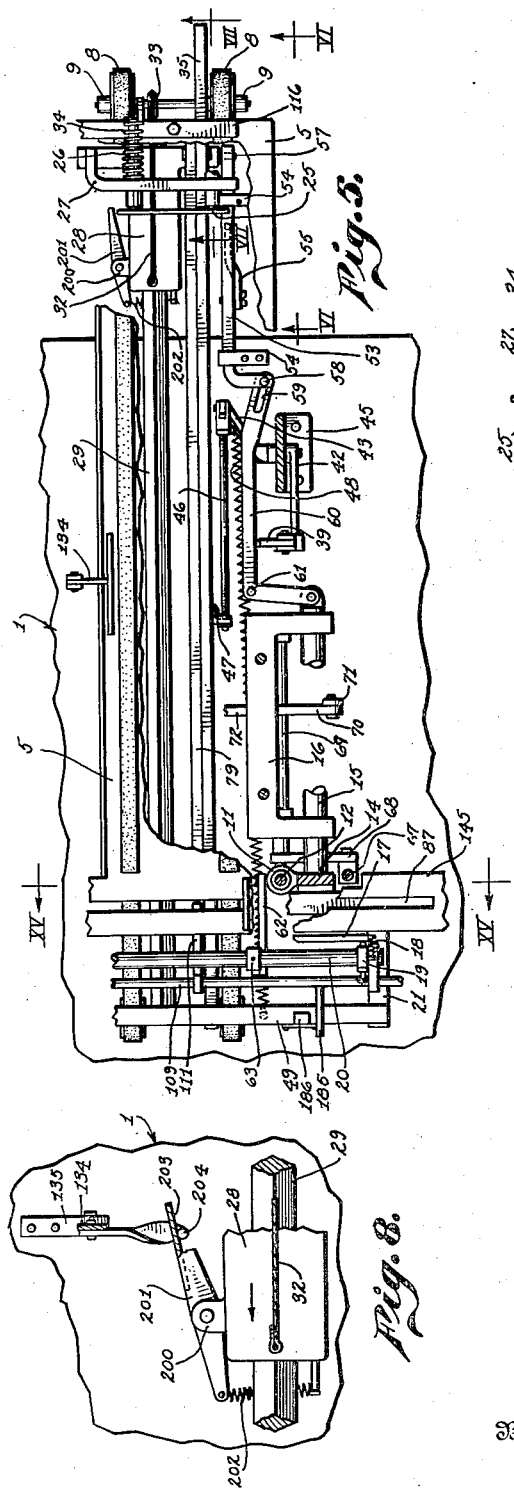
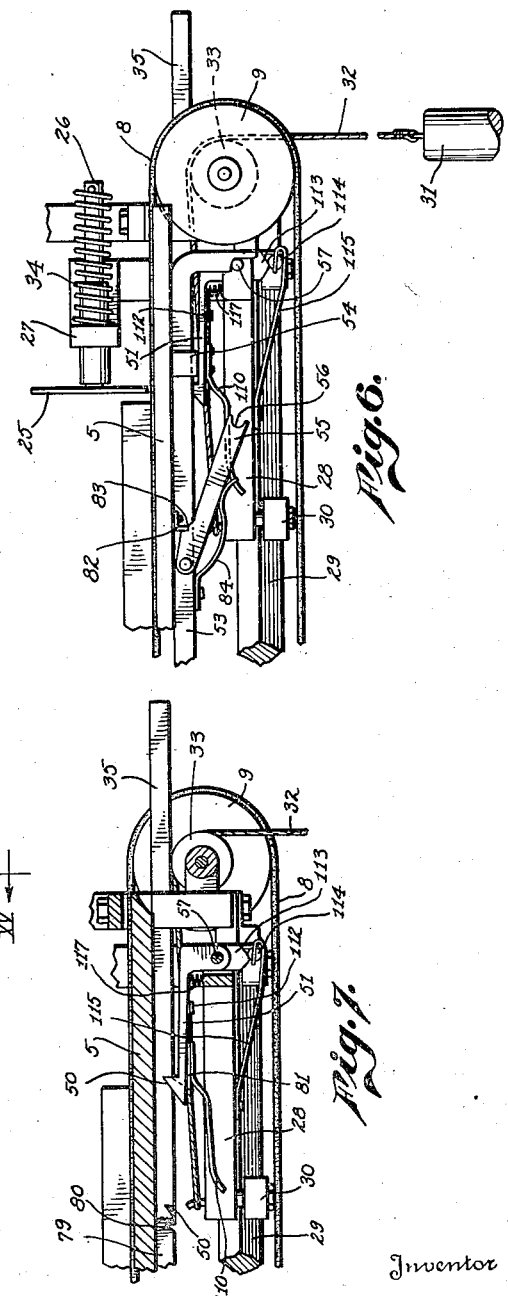
Inventor
Arthur S. Heineman
By Lyon & Lyon
Attorneys Feb. 1, 1938.　　A. S. HEINEMAN　　2,107,036
ARTICLE DIVIDING AND PACKAGING MACHINE
Original Filed Jan. 2, 1935　　23 Sheets-Sheet 5
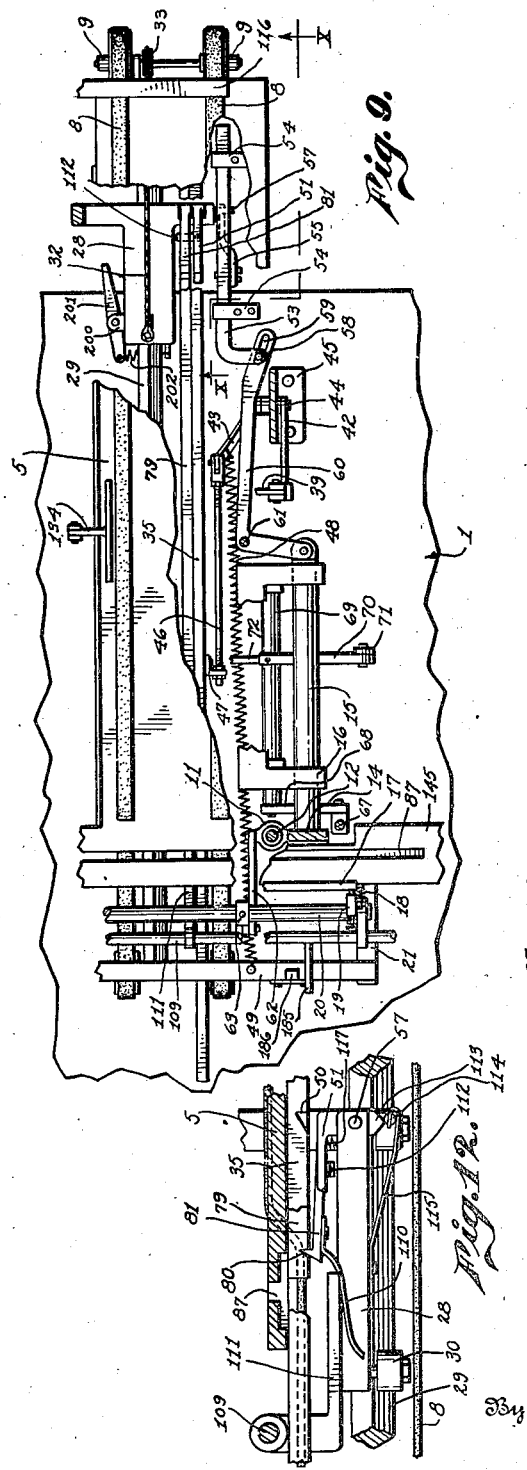
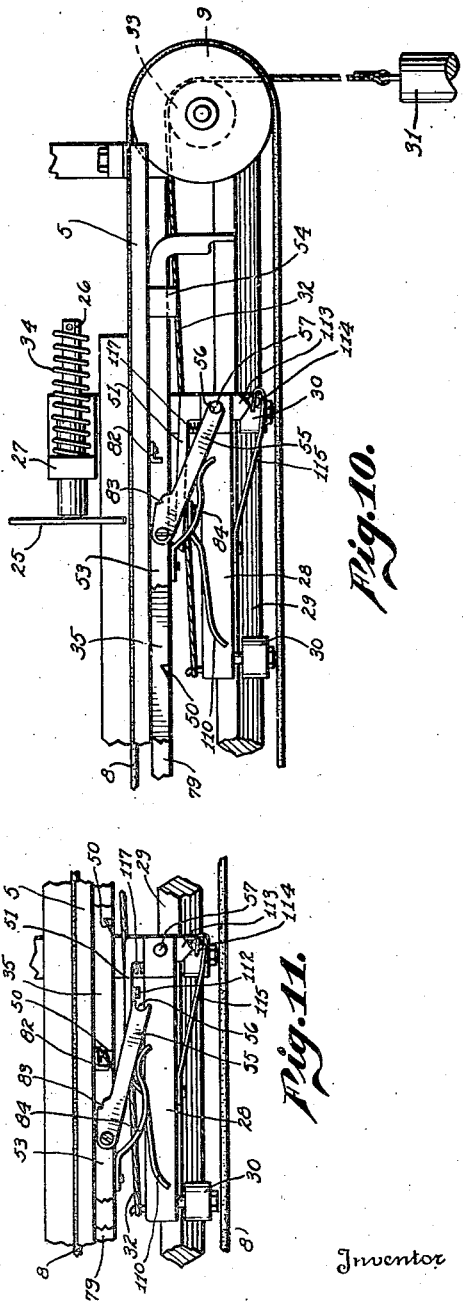
Inventor
Arthur S. Heineman
By Lyon&Lyon
Attorneys Feb. 1, 1938.  A. S. HEINEMAN  2,107,036
ARTICLE DIVIDING AND PACKAGING MACHINE
Original Filed Jan. 2, 1935    23 Sheets—Sheet 6
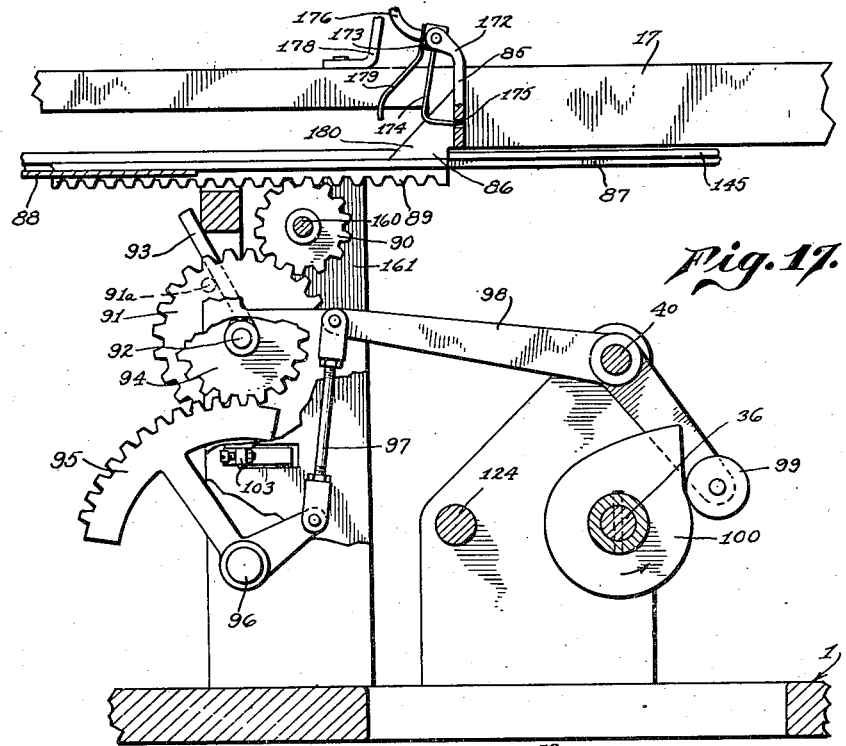
Fig. 17.
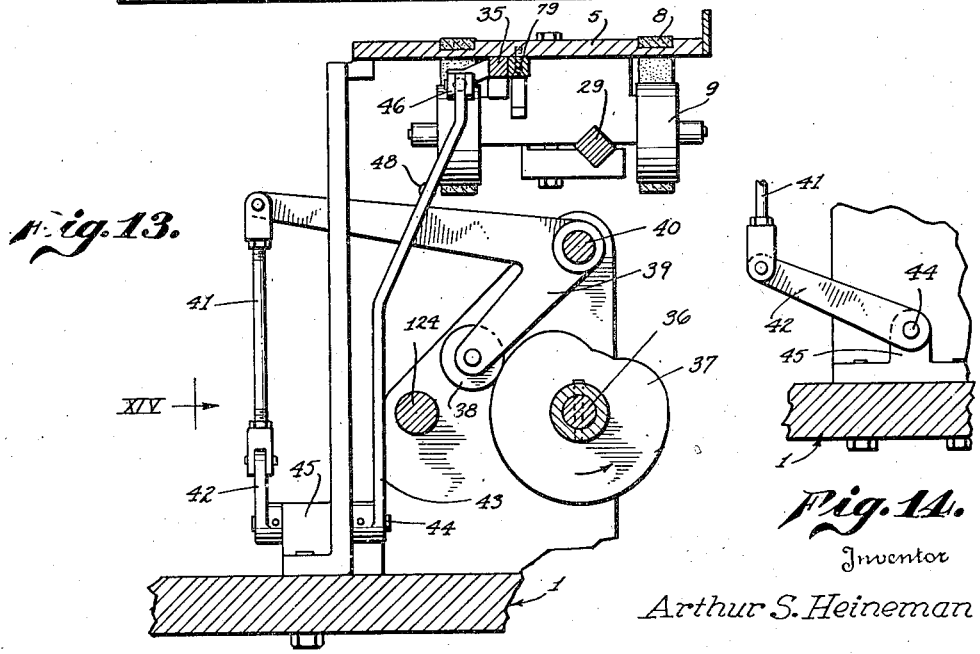
Fig. 13.
Fig. 14.
Inventor
Arthur S. Heineman
By Lyon & Lyon
Attorneys Feb. 1, 1938.   A. S. HEINEMAN   2,107,036
ARTICLE DIVIDING AND PACKAGING MACHINE
Original Filed Jan. 2, 1935   23 Sheets—Sheet 9
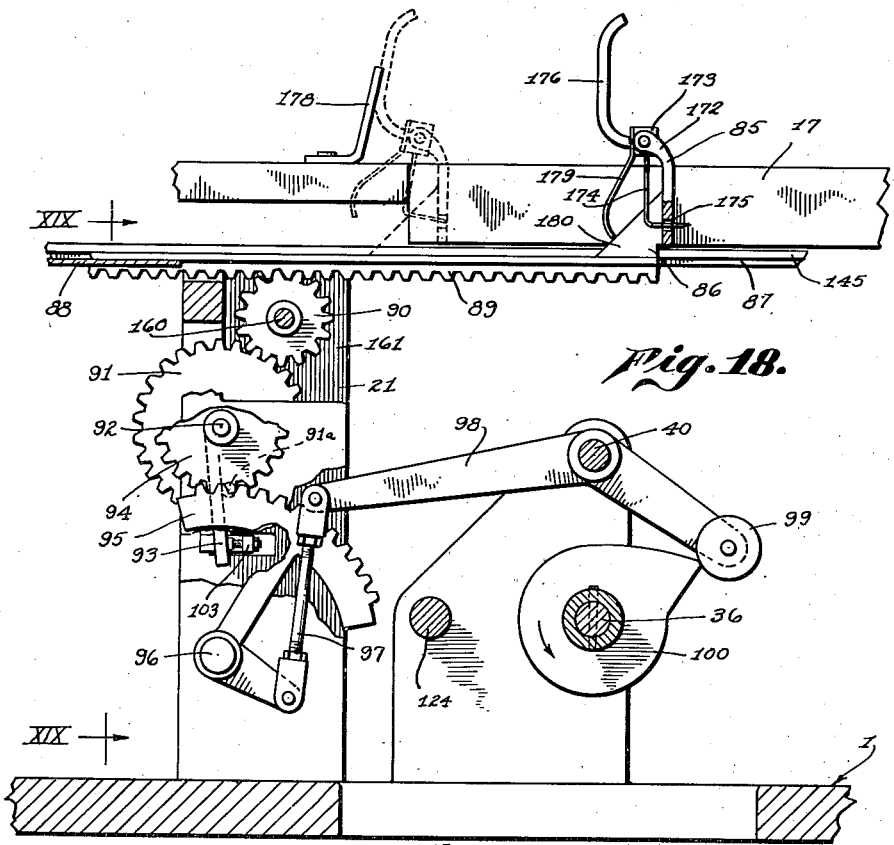
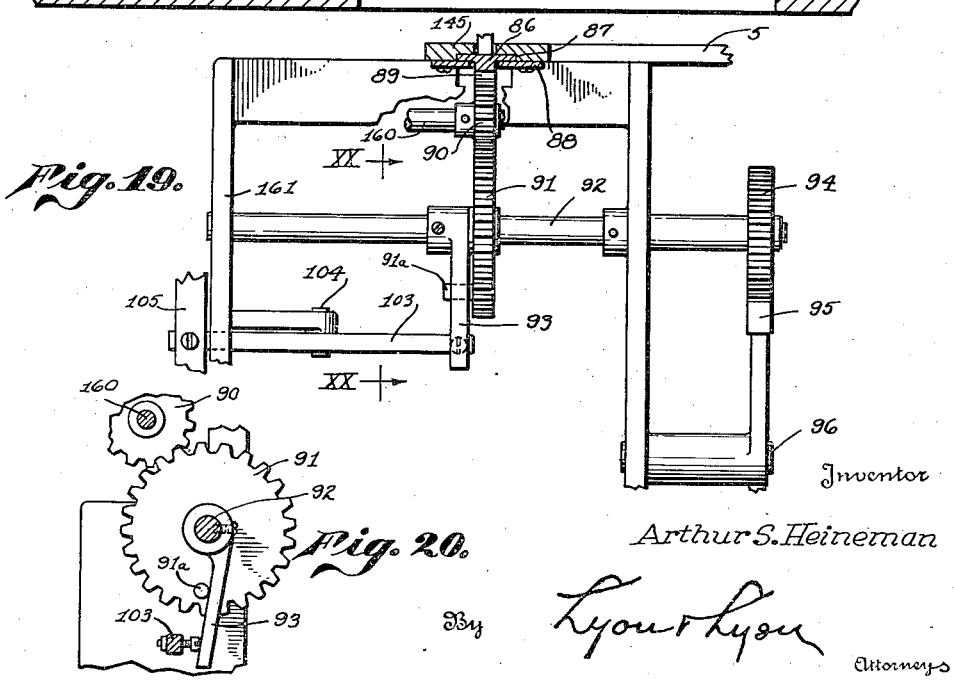

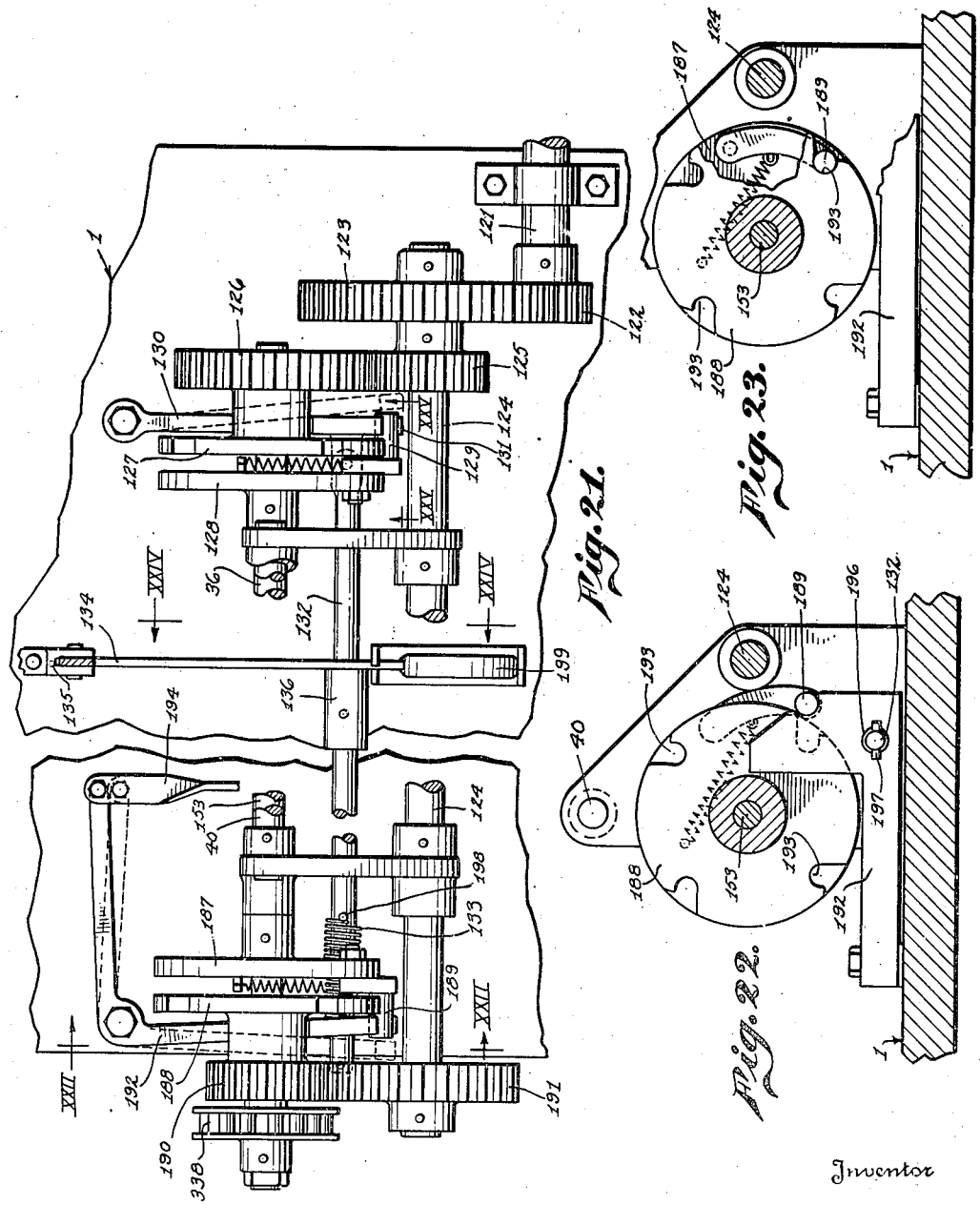

Feb. 1, 1938.  A. S. HEINEMAN  2,107,036
ARTICLE DIVIDING AND PACKAGING MACHINE
Original Filed Jan. 2, 1935  23 Sheets-Sheet 11
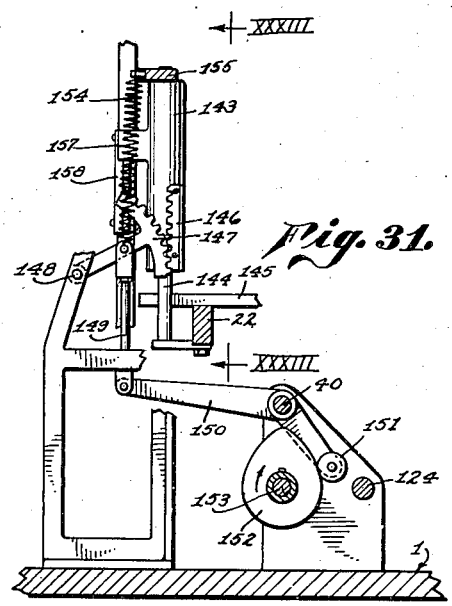
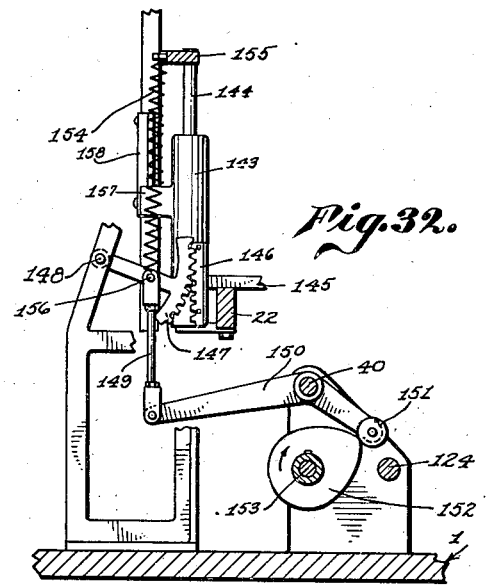
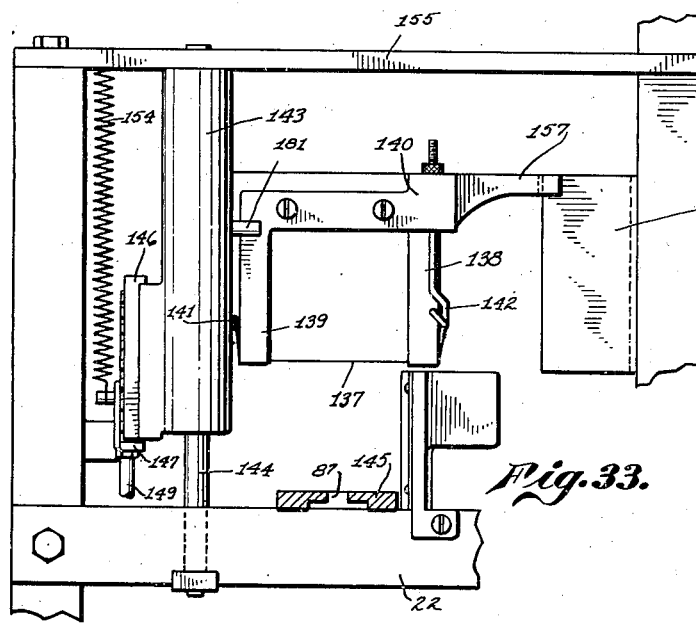
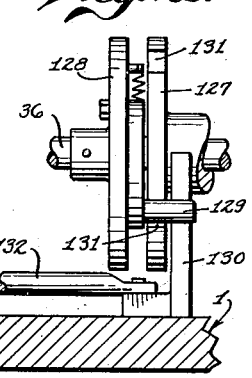
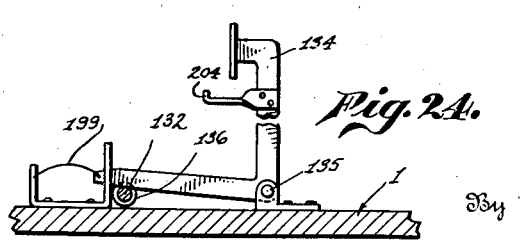
Inventor
Arthur S. Heineman
By Lyon & Lyon
Attorneys

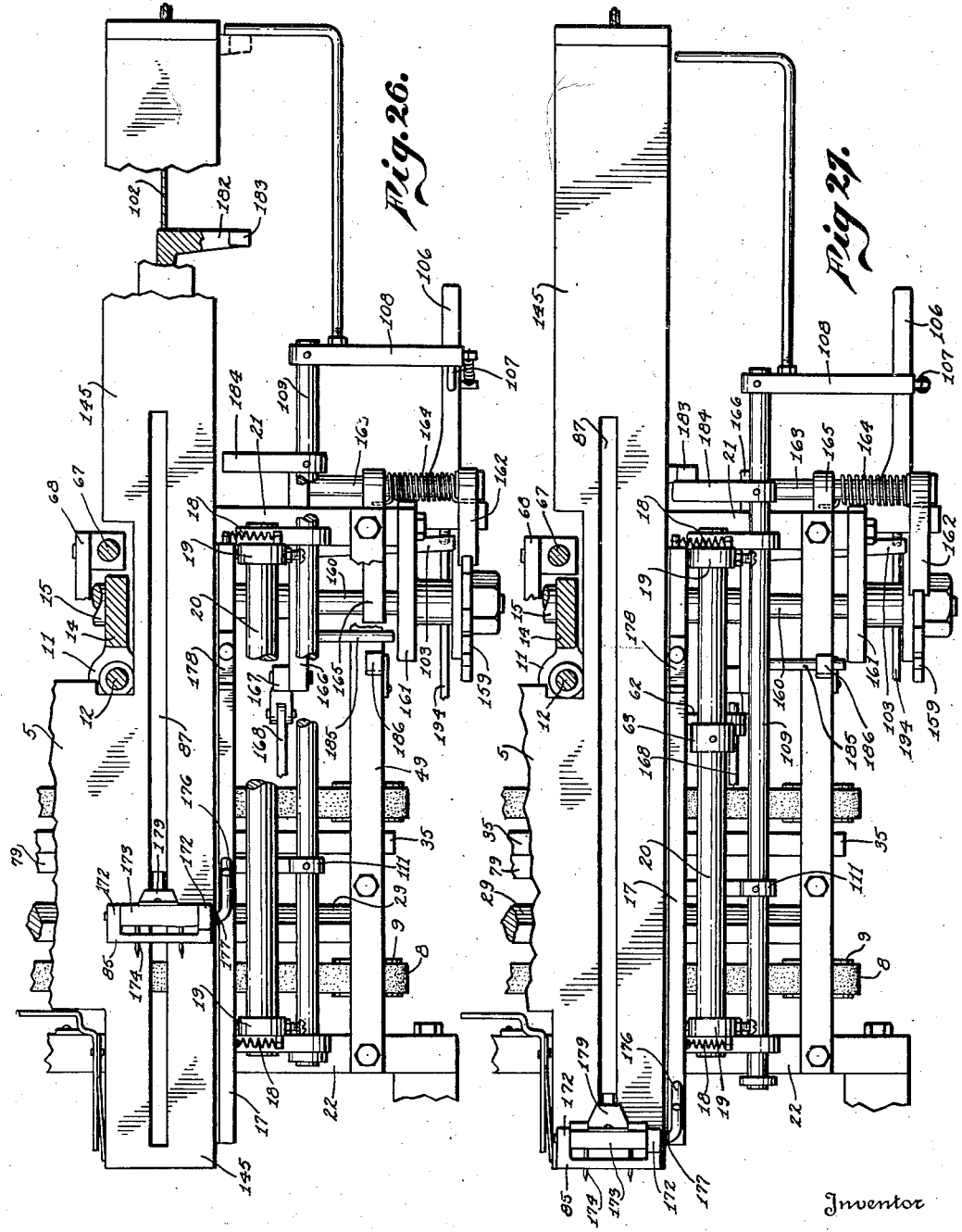

Feb. 1, 1938.　　　A. S. HEINEMAN　　　2,107,036
ARTICLE DIVIDING AND PACKAGING MACHINE
Original Filed Jan. 2, 1935　　23 Sheets-Sheet 13
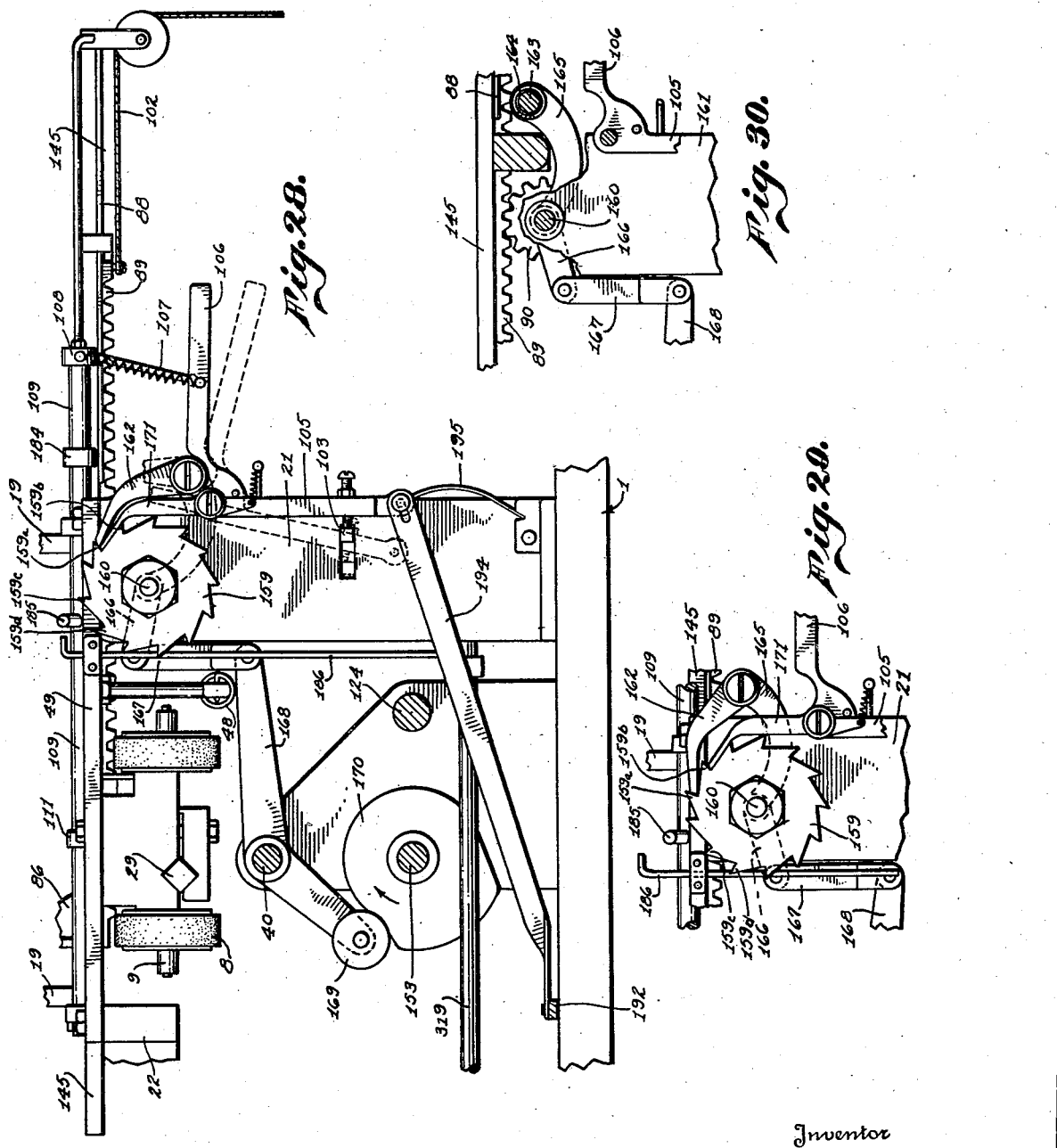
Inventor
Arthur S. Heineman
By Lyon & Lyon
Attorneys Feb. 1, 1938.  A. S. HEINEMAN  2,107,036
ARTICLE DIVIDING AND PACKAGING MACHINE
Original Filed Jan. 2, 1935  23 Sheets-Sheet 14
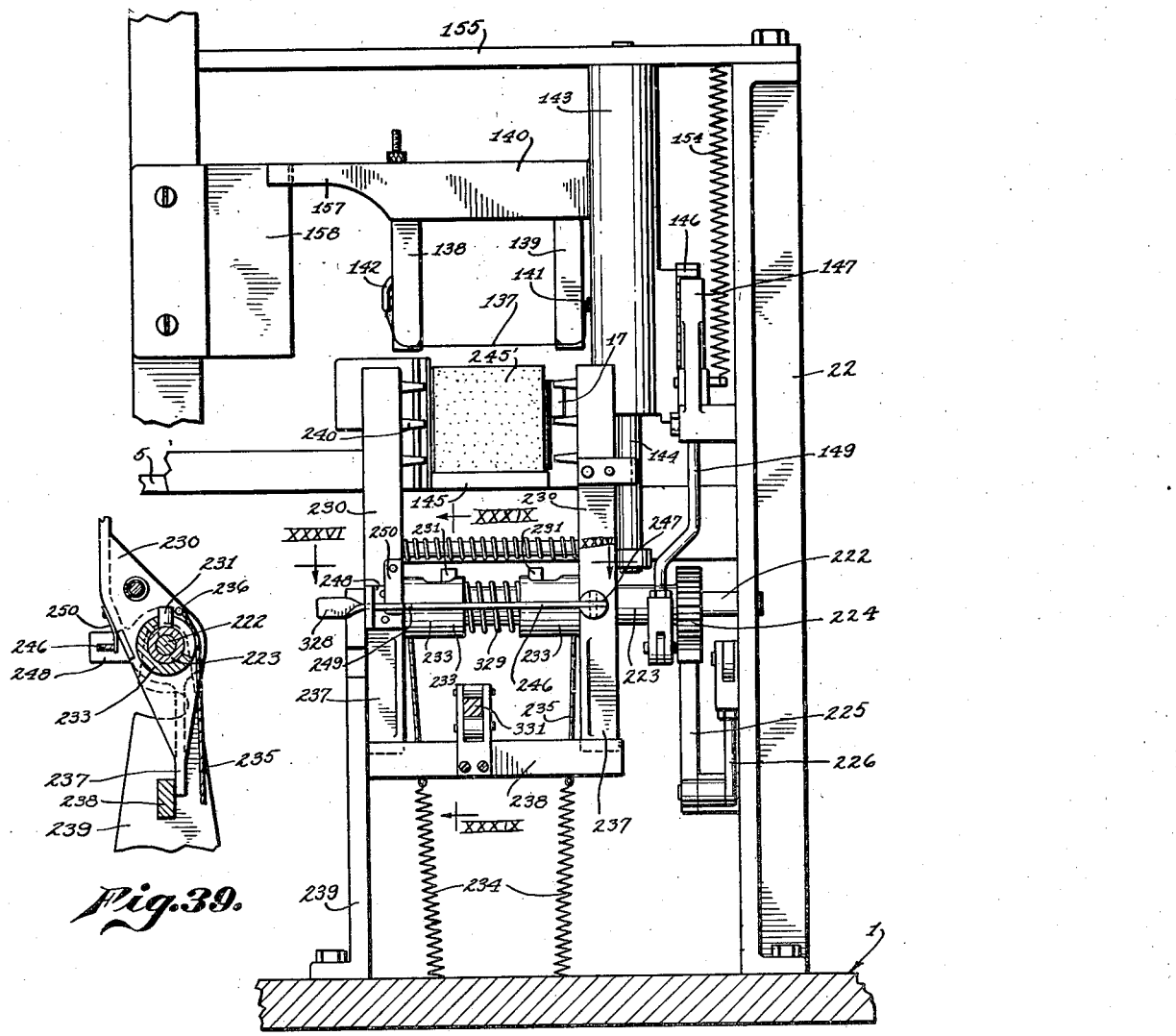
Fig. 39.
Fig. 34.
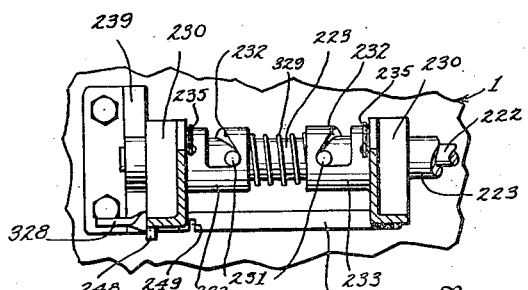
Fig. 36.
Inventor
Arthur S. Heineman
By Lyon & Lyon
Attorneys

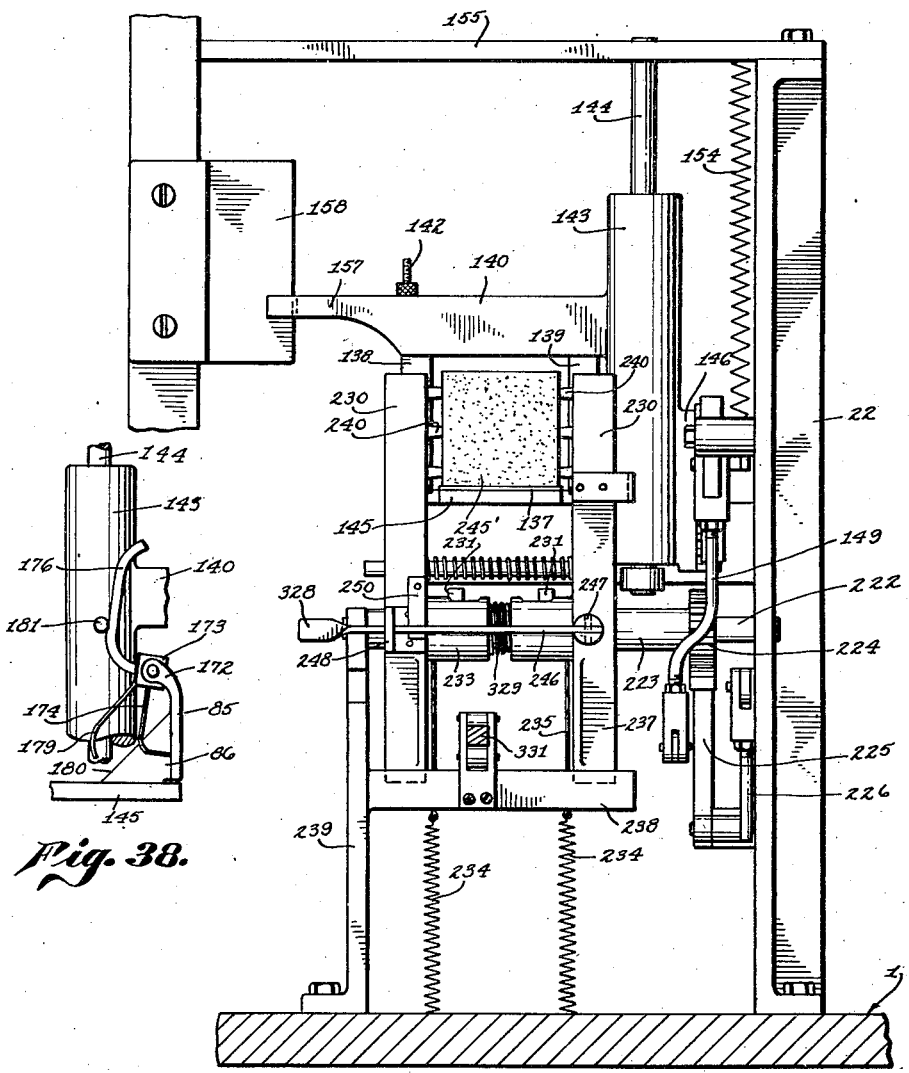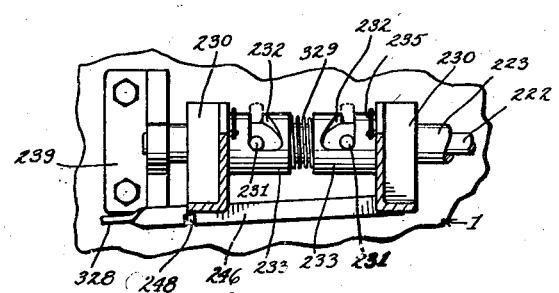

Feb. 1, 1938.                A. S. HEINEMAN                 2,107,036
                ARTICLE DIVIDING AND PACKAGING MACHINE
                Original Filed Jan. 2, 1935     23 Sheets-Sheet 16

Inventor
Arthur S. Heineman
By Lyon & Lyon
Attorney

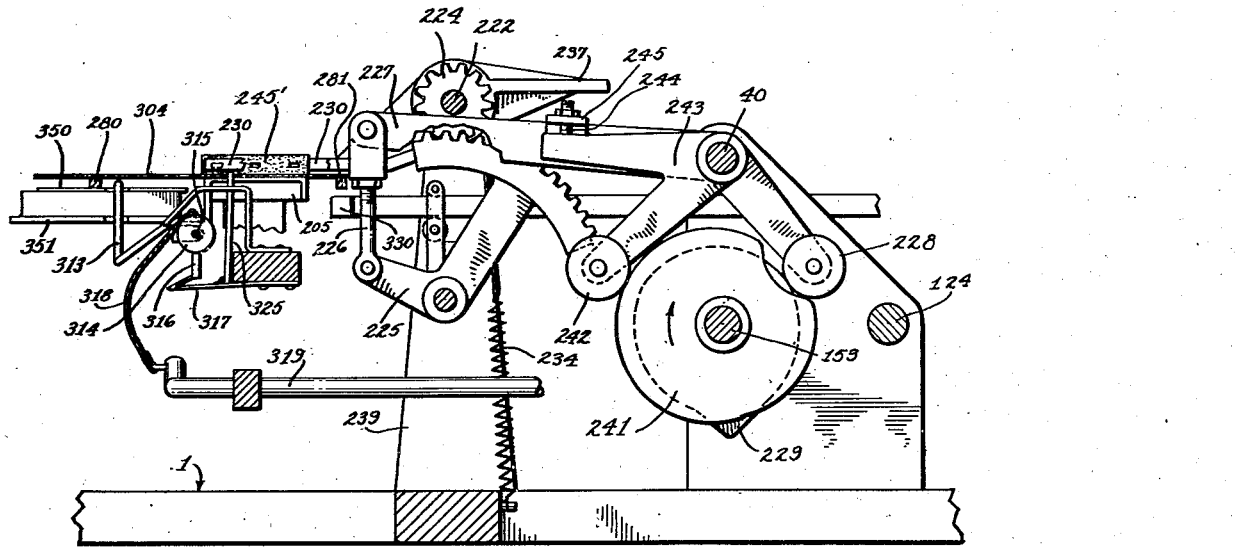
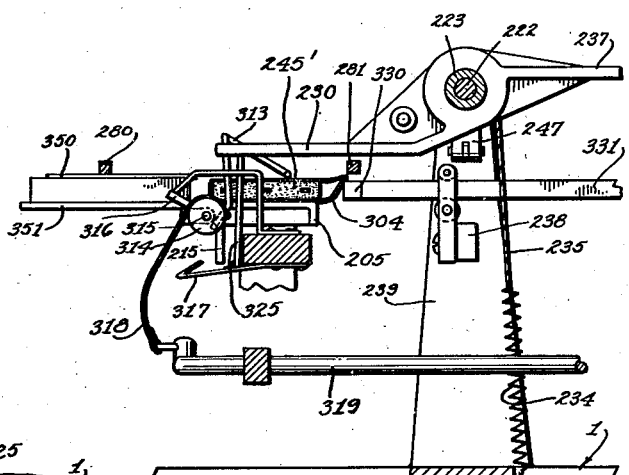
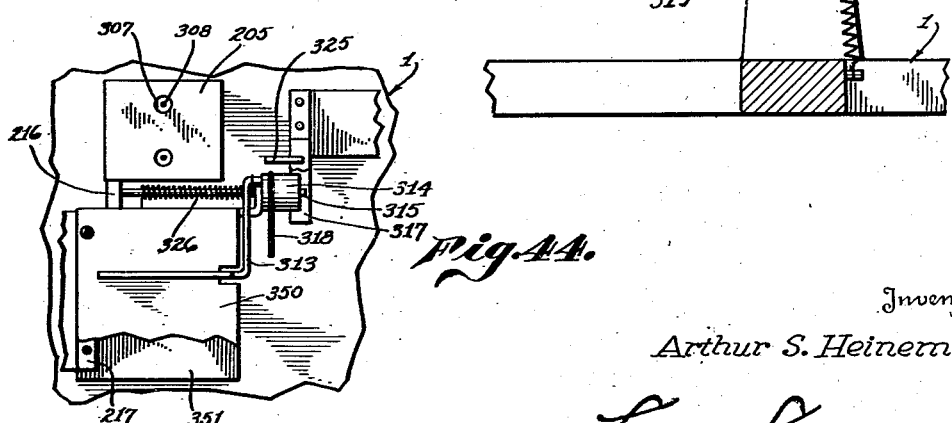

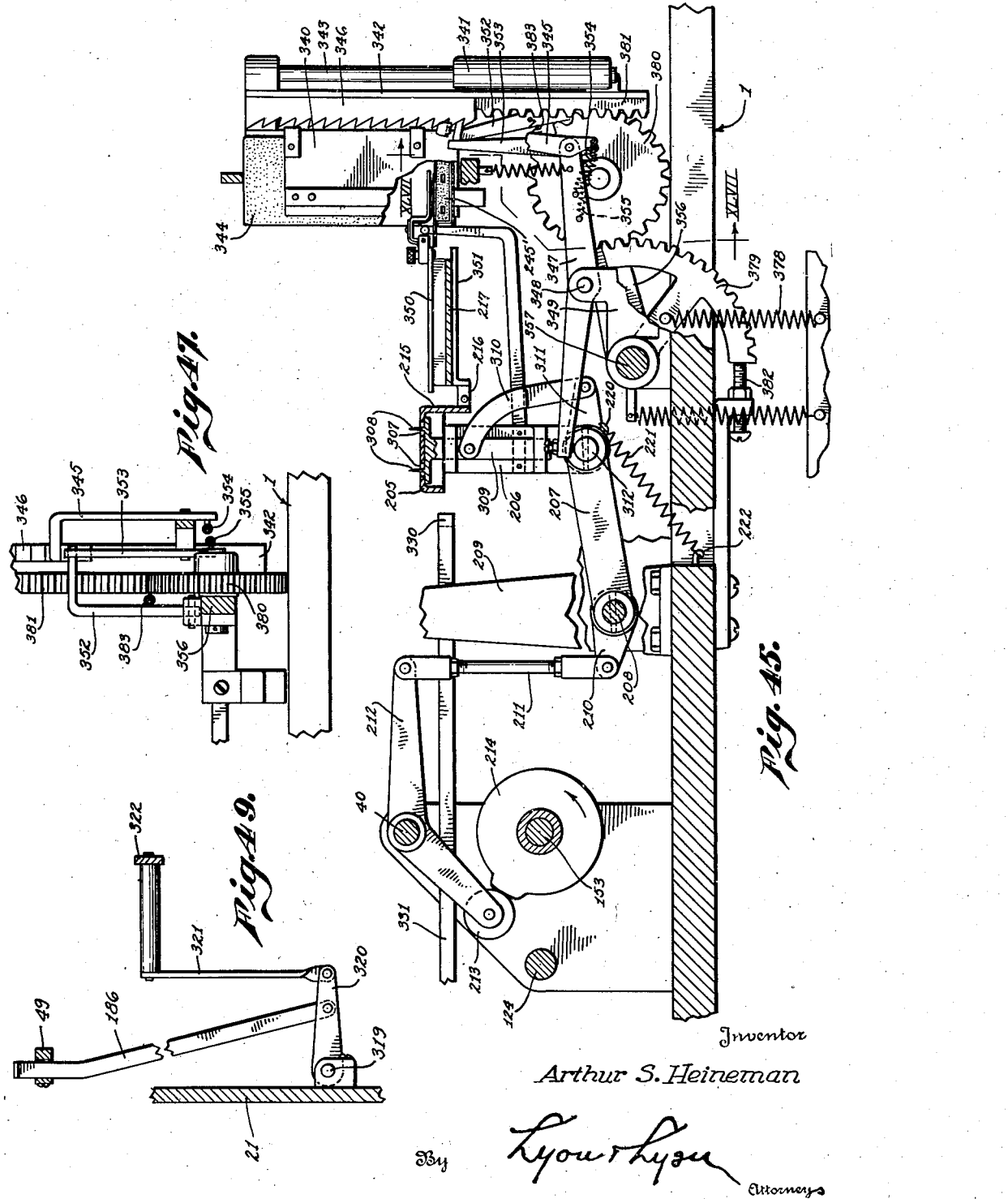

Feb. 1, 1938.   A. S. HEINEMAN   2,107,036
ARTICLE DIVIDING AND PACKAGING MACHINE
Original Filed Jan. 2, 1935   23 Sheets-Sheet 19
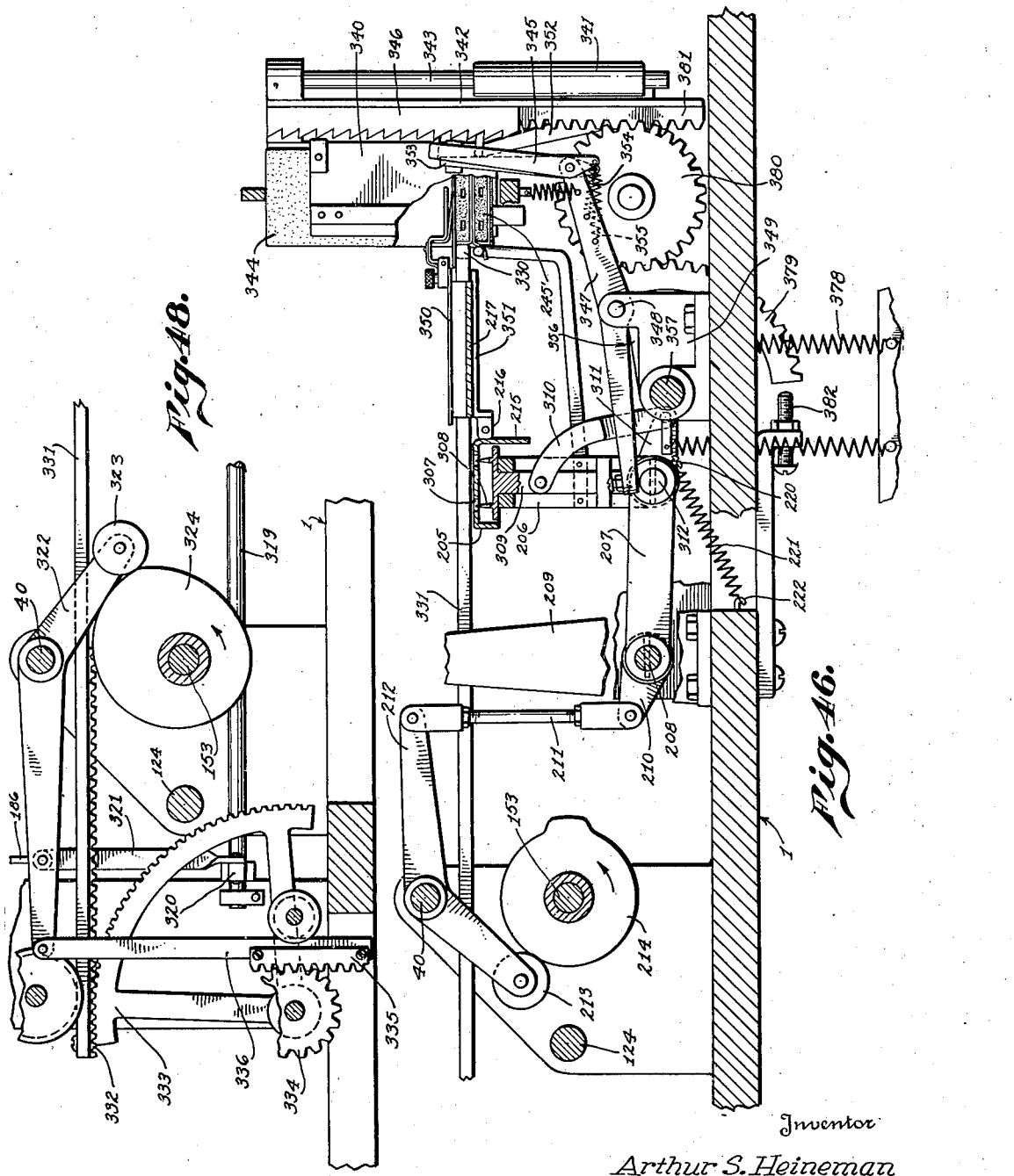
Inventor
Arthur S. Heineman
By Lyon & Lyon
Attorneys

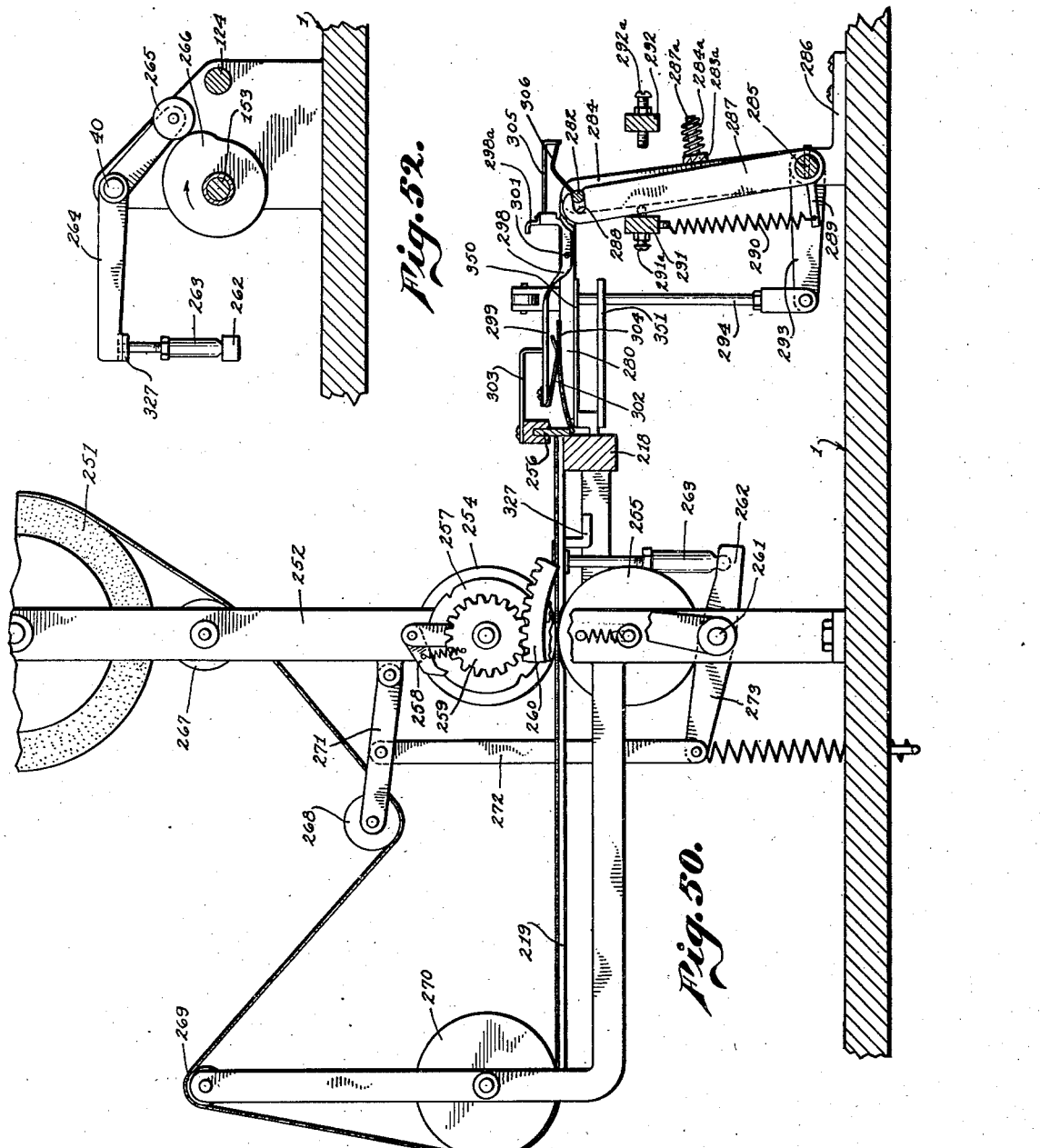

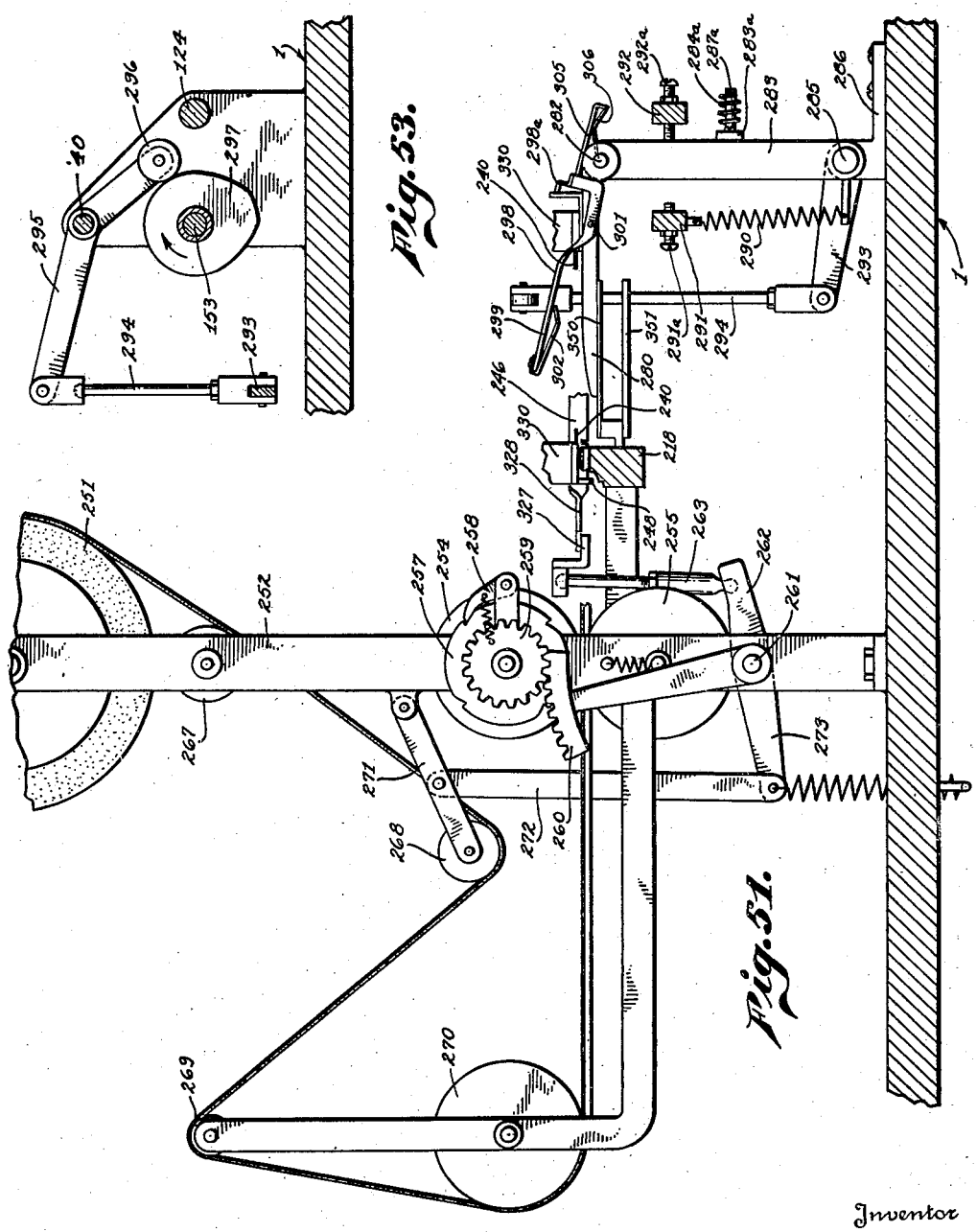

Feb. 1, 1938.  A. S. HEINEMAN  2,107,036
ARTICLE DIVIDING AND PACKAGING MACHINE
Original Filed Jan. 2, 1935  23 Sheets—Sheet 22

Inventor
Arthur S. Heineman
By Lyon & Lyon
Attorneys

Feb. 1, 1938.  A. S. HEINEMAN  2,107,036
ARTICLE DIVIDING AND PACKAGING MACHINE
Original Filed Jan. 2, 1935  23 Sheets-Sheet 23
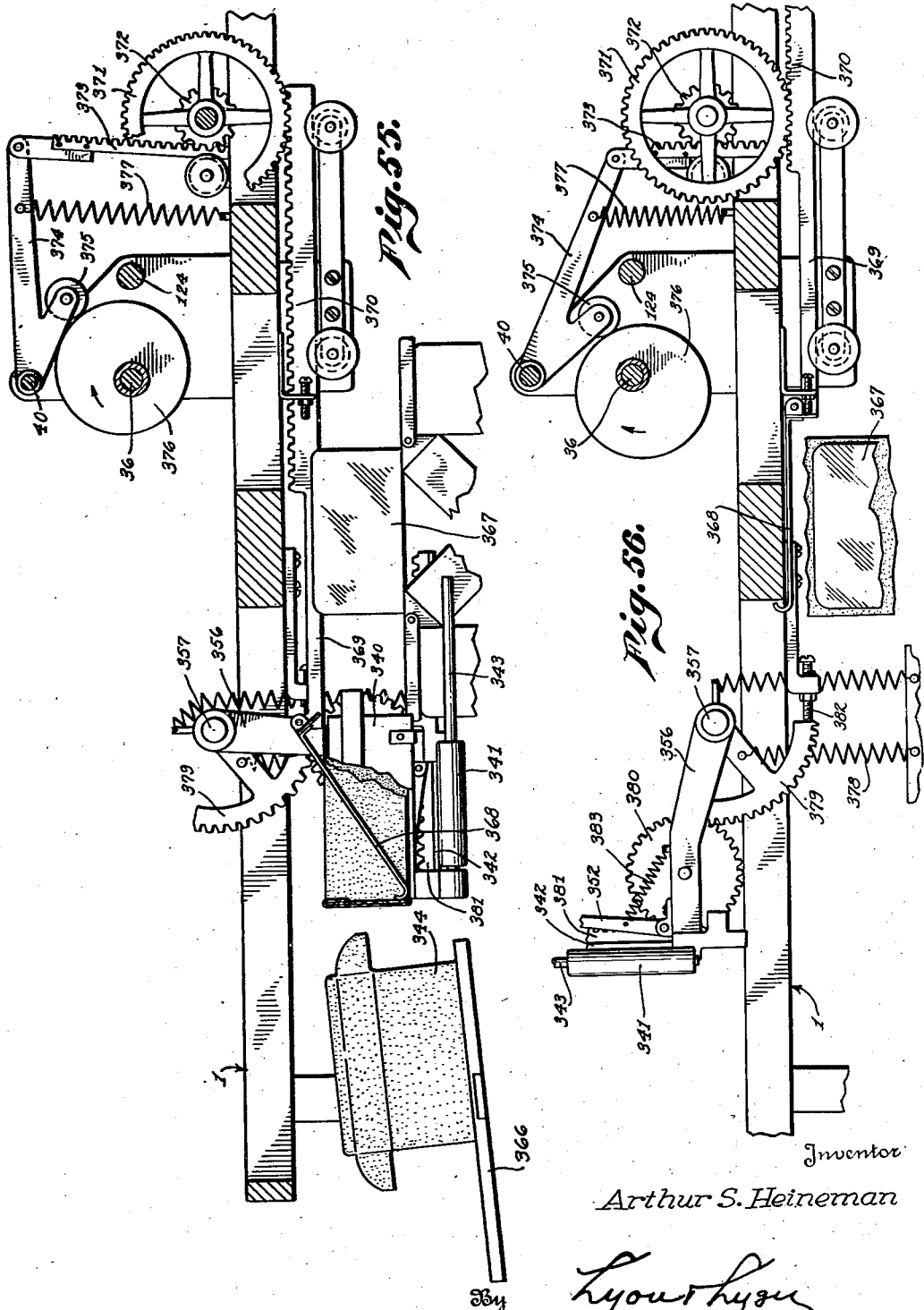
Inventor
Arthur S. Heineman
By
Attorneys Patented Feb. 1, 1938

2,107,036

UNITED STATES PATENT OFFICE 2,107,036

ARTICLE DIVIDING AND PACKAGING MACHINE

Arthur S. Heineman, Los Angeles, Calif.

Application January 2, 1935, Serial No. 183
Renewed June 23, 1937

10 Claims. (Cl. 93—2)

My invention relates to an article dividing and packaging machine, and has particular reference to a machine adapted to divide a commodity into small portions, each of which may be individually wrapped and packaged ready for commercial sale.

In the handling and packaging of certain commodities, it is desirable that the form in which the article sold to the consumer should be such that the article is in small individual units, each of which comprises a single serving or single portion of the commodity. It is usually an arduous task to divide commodities into minute portions and to individually wrap and package such small portions. This is particularly true when the commodity is of a somewhat plastic nature, such as butter or other product, which, though in a semisolid state at normal handling temperatures, readily softens and becomes quite plastic upon a slight rise in temperature, and is very slippery because of its oily characteristics, and, therefore, difficult to grasp without deforming, especially if the grasping means is at or about blood heat.

In the dairy industry particularly it is difficult to handle butter and to package the same, except when the butter is in relatively large blocks, the division of such butter into smaller units being heretofore impracticable in view of the difficulties encountered in handling a small unit of the mass because of its plasticity and oily characteristics.

It is, therefore, an object of my invention to provide a machine for packaging commodities, such as butter, in which a relatively large unit thereof may be fed into the machine, which will divide it into minute individual portions, and a number of such individual portions will be packaged together automatically.

Another object of the invention is to provide a machine of the character set forth in the preceding paragraph, wherein the machine will automatically evenly divide a large mass of the initial unit into a plurality of small fractional units, each of which contains the same weight of the commodity, and the sum of the small units so formed will equal the entire weight of the initial block or mass.

Another object of the invention is to provide a machine of the character set forth, wherein a mass or block of the commodity, of approximately a predetermined shape and approximately a predetermined weight, will be evenly divided in small fractional units irrespective of variations in the shape of the initial block and irrespective of variations in the weight of the initial block.

Another object of the invention is to provide a machine of the character set forth, wherein the fractional units so formed are subdivided into a plurality of minute portions, each of which constitutes a single serving of the commodity.

Another object of the invention is to provide a machine of the character set forth, wherein the small units formed from the initial block or mass will each be subdivided into a predetermined number of smaller individual servings, and in which each of said servings will be individually wrapped ready for packaging in a suitable container.

Another object of the invention is to provide a machine of the character set forth in which the predetermined number of individual servings so formed will be placed automatically within a container.

Another object of the invention is to provide a machine of the character set forth, wherein a predetermined block or mass of the material will be separated into equal fractional portions of the initial mass, and in which such fractional portions will be subdivided into individual servings, wrapped and packaged, and in which the subdividing of the fractional portions, their wrappings and packaging, will occur alternately with the separation of one of said fractional portions from the initial mass.

Other objects and advantages will be apparent from a study of the following specifications, read in connection with the accompanying drawings, wherein Fig. 1 is a front elevational view of a machine constructed in accordance with my invention;

Fig. 3 is a top plan view of the machine shown in Figs. 1 and 2;

Fig. 4 is a diagrammatic view, illustrating the manner of dividing an initial block or mass of a commodity, into equal small fractional units;

Fig. 5 is a detailed top plan view of a portion of my machine employed for dividing an initial block or mass of the material into small fractions and which I term a "fractionator";

Fig. 6 is a side elevational view of a portion of the "fractionator" shown in Fig. 5, taken along the line VI—VI of Fig. 5, and illustrating the position of the block feeding mechanism in its fully retracted position;

Fig. 7 is a vertical sectional view of a portion of the "fractionator" shown generally in Fig. 5, taken along line VII—VII of Fig. 5, and illustrating the intermittent drive employed for the initial block of the commodity in its normal or fully retracted position;

Fig. 8 is a detailed view illustrating a clutch operating mechanism employed for controlling the driving mechanism of the "fractionator";

Fig. 9 is a top plan view of the "fractionator" showing a portion of the table broken away, and illustrating the positions of the parts thereof when the machine has been operated to measure the initial block, and adjusting the position of knives and cutters to equally divide the block so measured;

Fig. 10 is a detail elevational view, taken along line X—X of Fig. 9;

Fig. 11 is a detail sectional view of a portion of the device shown in Fig. 10, illustrating the position of the parts as the initial block is fed toward the fractionating knife;

Fig. 12 is a detail sectional view of a portion of the fractionator illustrating the releasing of the driving mechanism therefor;

Fig. 13 is a detail view of the driving mechanism for the fractionator;

Fig. 14 is a detail view, taken along line XIV—XIV of Fig. 13, illustrating the crank and its connections shown in Fig. 13;

Fig. 17 is a detail view illustrating the initial drive employed for feeding the fractional portion of butter, or other commodity, toward the subdividing apparatus, illustrated in its initial position;

Fig. 18 is a detail view, similar to Fig. 17, illustrating the initial feeding mechanism in the position ready for subdivision;

Fig. 19 is a detail vertical sectional view taken along line XIX—XIX of Fig. 18;

Fig. 20 is a detail sectional view taken along line XX—XX of Fig. 19;

Fig. 21 is a top plan view of the main table of my machine illustrating the main drive shafts and clutch controls for the fractionating mechanism and for the subdividing mechanism;

Fig. 22 is a detail vertical sectional view, taken along line XXII—XXII of Fig. 21;

Fig. 23 is a fragmentary sectional view, similar to Fig. 22, showing the clutch thereon in engaged position;

Fig. 24 is a detail sectional view taken along line XXIV—XXIV of Fig. 21, illustrating the operation for starting the fractionator;

Fig. 25 is a detail sectional view taken along line XXV—XXV of Fig. 21, illustrating the operation of one of the clutches thereon;

Fig. 26 is a top plan view of the feeding mechanism employed on the subdivider illustrated in its feeding position;

Fig. 27 is a top plan view similar to Fig. 26, illustrating the feed for the subdivider in its extreme forward position at the end of the operation of subdividing a fraction of the commodity;

Fig. 28 is a side elevational view of the subdivider feeding mechanism shown in Figs. 26 and 27;

Fig. 29 is a detail view of the step-by-step driving mechanism illustrated in Fig. 28;

Fig. 30 is a detail sectional view illustrating the connection of the step-by-step drive mechanism and the feed table of the subdivider;

Fig. 31 is a detail sectional view illustrating the driving mechanism for the subdividing cutter illustrated in its elevated position;

Fig. 32 is a view similar to Fig. 31, illustrating the subdivider cutter in its lowermost position;

Fig. 33 is a front elevational detail view of the subdividing cutter taken along line XXXIII—XXXIII of Fig. 31;

Fig. 34 is a detail elevational view of the subdividing cutter and the transfer mechanism for transferring the individual serving from the cutter to the wrapping mechanism, illustrated in its initial position;

Fig. 35 is a view similar to Fig. 34, illustrating the transfer mechanism in its serving engaging position;

Fig. 36 is a detail sectional view taken along line XXXVI—XXXVI of Fig. 34, illustrating the mechanism for moving the transfer fingers, and shown in its initial position;

Fig. 37 is a detail view, similar to Fig. 36, illustrating the moving mechanism in the position of the transfer mechanism, illustrated in Fig. 35;

Fig. 38 is a detail view of a portion of the subdividing cutting mechanism illustrating the withdrawal of the butter-holder during the final subdividing cut;

Fig. 39 is a detail sectional view, taken along line XXXIX—XXXIX of Fig. 34, illustrating the locking mechanism employed for holding the transfer fingers in engaging position;

Fig. 42 is a side elevational view of the driving mechanism for the transfer apparatus, as viewed from the right-hand side of Fig. 39, and also illustrating the paper wrapping mechanism;

Fig. 43 is a detail view, similar to Fig. 42, illustrating the paper folding operation;

Fig. 44 is a detail top plan view of the wrapping table and paper folding mechanism shown in Figs. 42 and 43;

Figure 1:
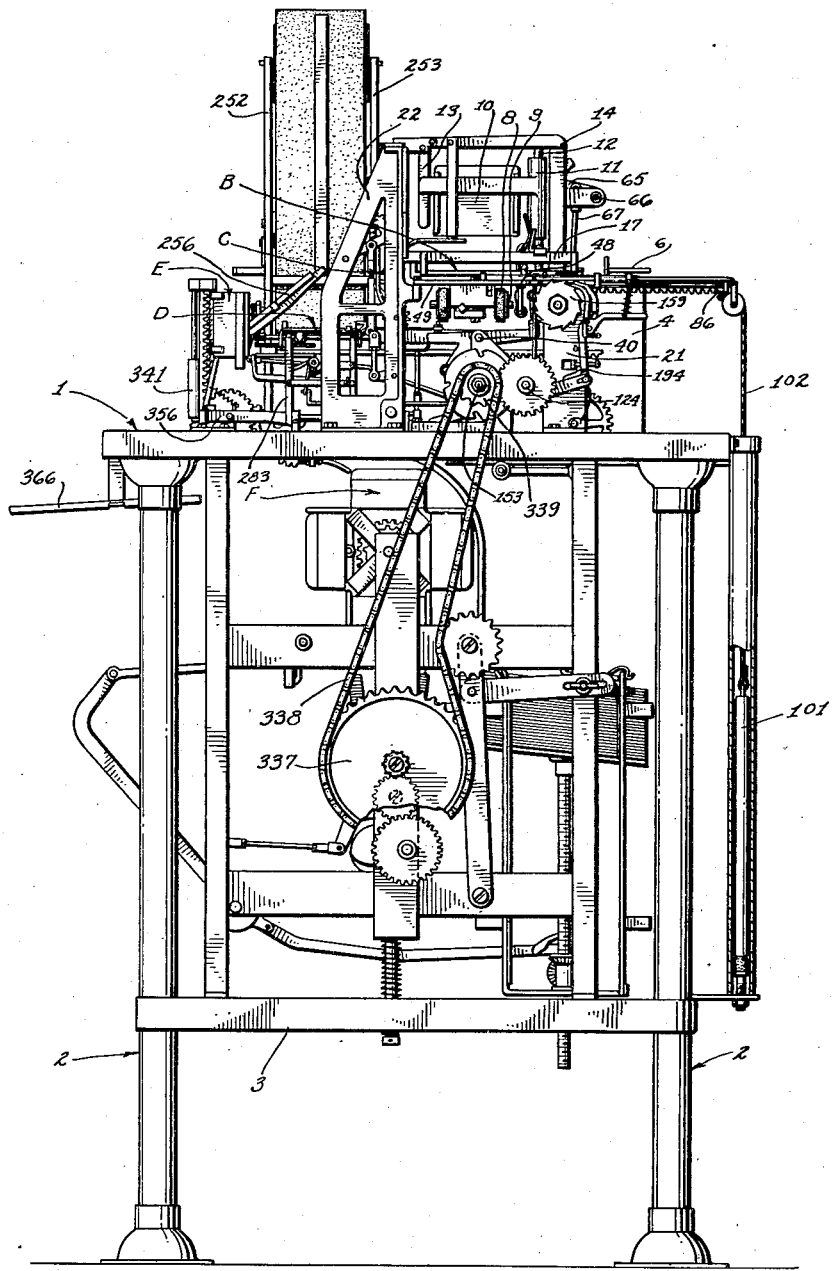
Figure 57:
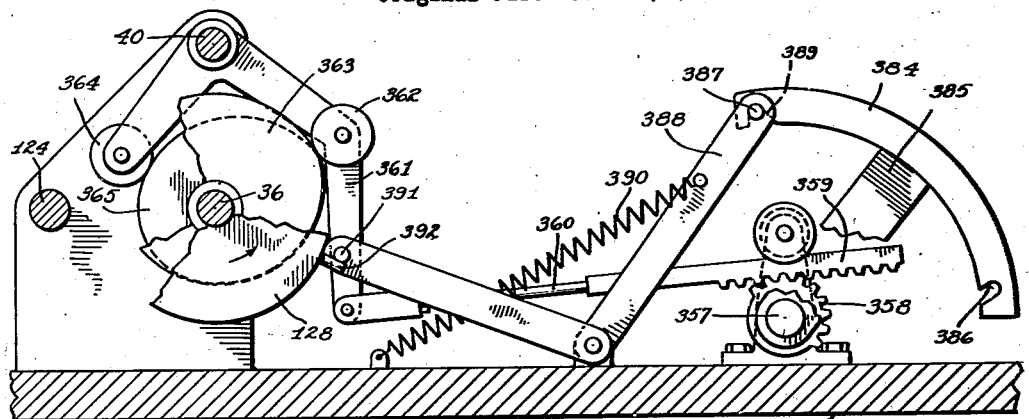
Figure 58:
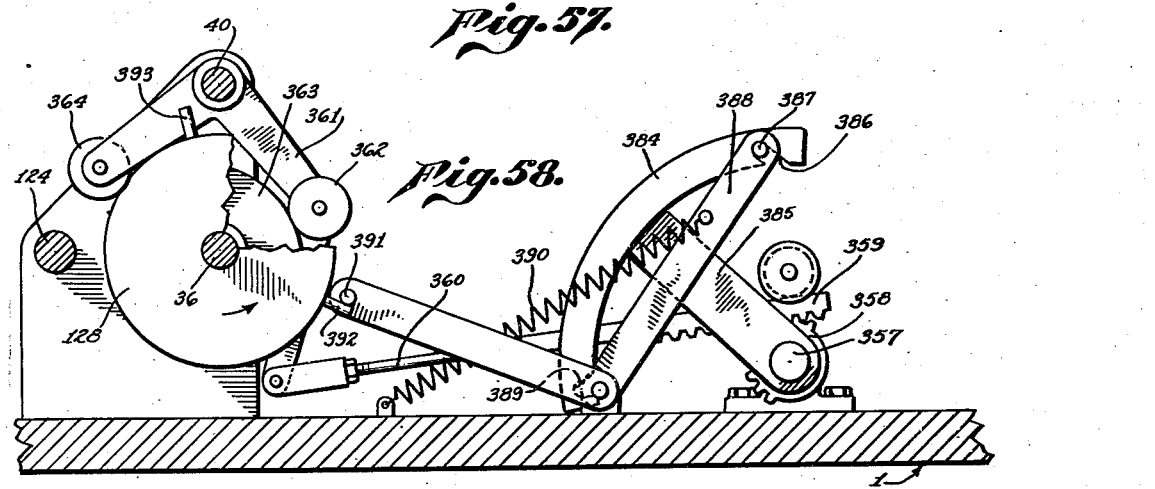
Figure 54:
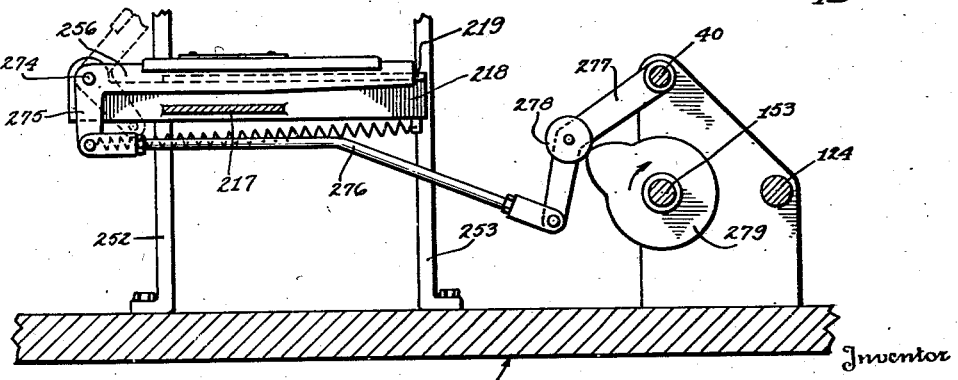

Fig. 45 is a detail elevational view, looking from the rear of Fig. 1, illustrating the operating mechanism for lowering the paper table, and taken along line XLV—XLV of Fig. 3, and illustrating the driving mechanism for raising and lowering the wrapping table with the table in its uppermost position and also illustrating the mechanism for intermittently lowering the box or container in which the individual servings are placed;

Fig. 46 is a view similar to Fig. 45, illustrating the table in its lowered position;

Fig. 47 is a detail sectional view, taken along line XLVII—XLVII of Fig. 45, illustrating the gearing and step-by-step feeding mechanism employed therein;

Fig. 48 is a detail sectional view taken in the same plane as Fig. 46, and illustrating the driving mechanism for the individual serving pusher employed to press the individual serving into the receiving container;

Fig. 49 is a detail view, illustrating the subdividing feed-release mechanism;

Fig. 50 is a detail view, looking from the right-hand side of Fig. 3, illustrating the feeding, cutting and transfer mechanism employed for furnishing individual wrappers for the individual servings;

Fig. 51 is a view similar to Fig. 50, illustrating the paper feeding and transfer mechanism in its retracting position;

Fig. 52 is a detail view of the portion of the driving mechanism employed for operating the paper feed and tension mechanism;

Fig. 53 is a detail view of the driving mechanism employed for operating the paper transfer mechanism;

Fig. 54 is a detail view of the paper cutting mechanism employed for separating the paper into individual wrappers;

Fig. 55 is a detail view of the box-ejecting and box-feeding mechanisms employed with my machine, and illustrating the positions thereof at the instant of ejecting a filled box or carton;

Fig. 56 is a view similar to Fig. 55, illustrating the box-ejecting mechanism in the position immediately after the filled carton has been ejected and a new carton set in place in the machine;

Figure 57 is a detail view of the driving mechanism and locking mechanism to drive and lock the box-ejecting and positioning mechanism, illustrating the same in the lowermost position of the box prior to the ejection thereof; and Fig. 58 is a detail view, similar to Fig. 57, illustrating the positions of the locking mechanism when an empty box is initially placed ready for receiving the individual servings.

Referring to the drawings, I have illustrated my machine as particularly adapted for the cutting, wrapping and packaging of butter, in which the butter taken from the creamery may be in slabs or blocks of any desired shape and size, though I have illustrated my machine as particularly adapted for use with butter which is either cut, pressed, or extruded in an elongated slab having a cross section of approximately 1½ inches by 3 inches and having a length of approximately 16 inches. Such slabs of butter are commonly produced in the creamery industry at the present time, each of these slabs having an approximate weight of 2½ pounds.

In order to readily appreciate the fractionating and subdividing of butter in accordance with my invention, it should be understood that at the present time it is the common practice in the creamery industry to divide a slab of butter, such as that set forth in the preceding paragraph, into a number of smaller fractions, each of which contains about one-quarter of a pound of butter, such sections being cut from the slab or extruded ribbon of butter by making lateral cuts therethrough, the dimensions of which are approximately 1½ x 3 inches, and each individual section is wrapped, four of the same often being placed in a single box or carton and sold to the trade as one pound of butter.

In serving butter to individual consumers, it is also common practice, (as in restaurants) to subdivide butter blocks or bricks into small individual servings by making lateral and/or longitudinal cuts across a section, each individual serving being approximately ⅛th inch to ⅜th inch in thickness.

In the embodiment of my machine illustrated and described herein, a slab or 2½-pound block of butter is automatically divided into 10 equal fractions by making 9 lateral cuts through the cross-section of the slab after which each of the quarter-pound fractions is passed to the subdividing portion of my machine, wherein each quarter-pound fraction is divided into a plurality of small individual servings similar to those now formed by hand.

While I have shown in the embodiment of the invention illustrated herein the subdivision of the quarter-pound sections into twelve individual servings, it will be understood that any other number of individual servings may be formed by suitable adjustment of the machine. It is equally obvious that I may build this machine to divide any given mass of predetermined approximate shape into any predetermined number of fractions.

Figure 2:
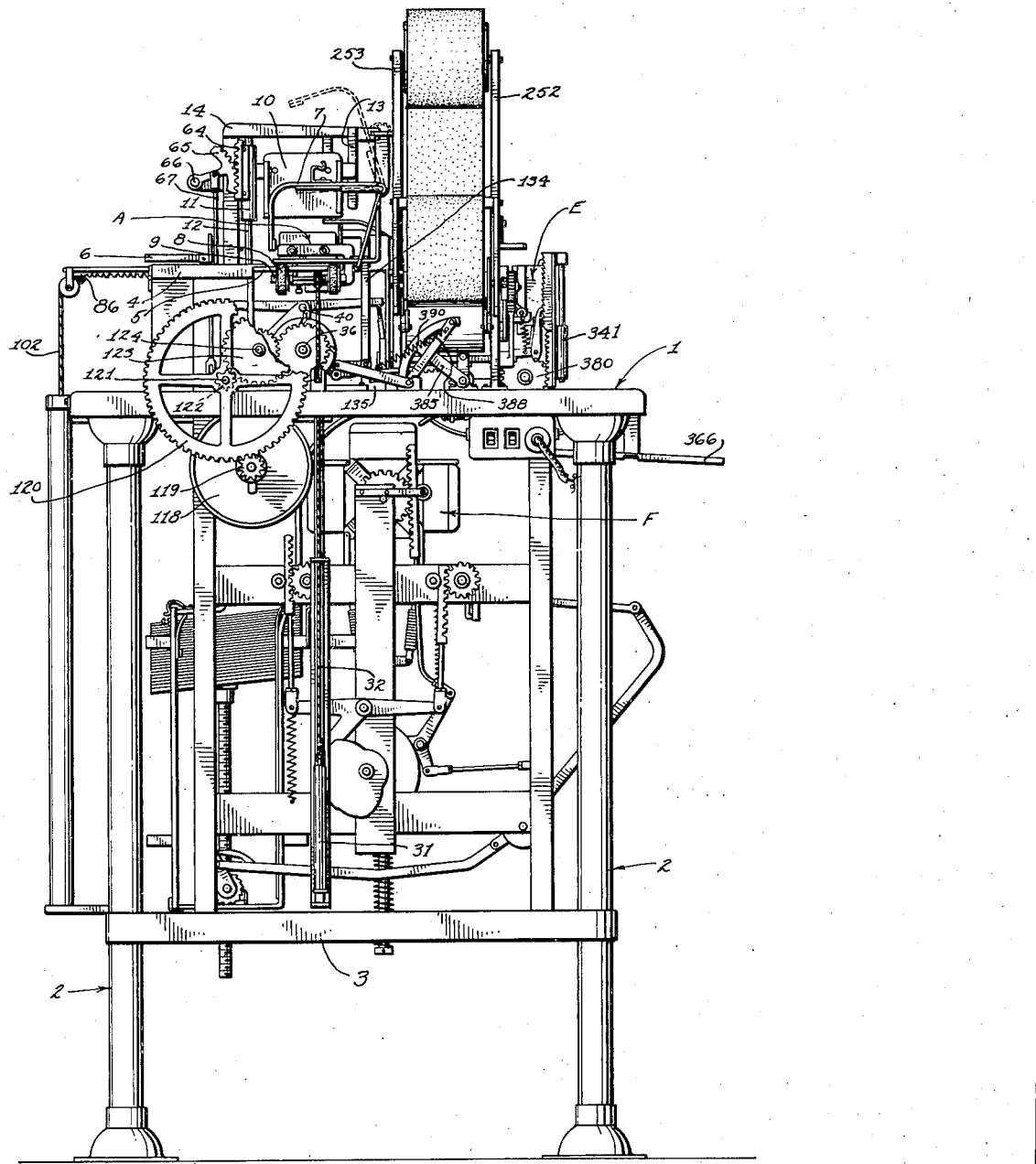
Fig. 2 is a rear elevational view of the machine shown in Fig. 1.

Referring particularly to Figs. 1, 2, and 3, it will be observed that my machine comprises a main table 1 which may be supported in any suitable manner, as upon four upright legs 2 so connected together by cross braces 3 as to form with the table 1 a substantially rigid construction mounting the table 1 at a convenient level above the floor or other foundation upon which the machine may rest.

Mounted immediately above the main table 1 is a "fractionator" indicated generally by the reference character A which extends longitudinally across the main table 1 and terminates at a subdivider indicated generally by the reference character B, which preferably extends transversely across the end of the fractionator A. At the end of the subdivider B is mounted a transfer mechanism indicated generally by the reference character C, which is arranged as hereinafter described to grasp each individual serving formed by the subdivider B and transfer the same to a wrapping apparatus indicated by the reference character D by which each individual serving is wrapped with paper, after which the wrapped serving is passed automatically to a carton-holding and packaging mechanism indicated generally by the reference character E.

*Fractionating mechanism A*

The fractionating mechanism A is illustrated particularly in Figures 3, and 5 to 16, inclusive, and includes a butter slab-receiving plate 4, which may be provided with suitable automatic mechanism for feeding a slab of butter from the plate 4 onto a slab table 5, though for simplicity in this application, such feeding of the slab of butter from the receiving plate 4 to the table 5 is illustrated as being accomplished by hand through the agency of a frame 6 slidable laterally toward and away from the slab table 5 as illustrated in Figure 3.

The slab table 5 is preferably provided with a hinged retaining frame 7 which may be rotated away from the table 5 when the slab of butter is pressed thereon and which can then be lowered to engage the left-hand side of the butter slab as viewed in Figure 3 to hold the slab of butter on the table 5, while the frame 6 is withdrawn to the full line position shown in Figure 3.

The slab of butter, when placed upon the slab table 5 may then be moved in the direction of the longitudinal axis of the slab, as by forming the slab table 5 of an elongated flat plate over which the butter may readily slide.

If desired, the movement of the butter over the table 5 may be facilitated by providing a pair of spaced endless belts 8 upon suitable pulleys 9 at opposite ends of the table 5 so that the slab of butter will rest upon the belts 8 and may be readily moved toward the fractionating knife. In the form of the apparatus illustrated herein, the belts and pulleys are not mechanically driven and merely form an antifriction device facilitating the movement of the slab of butter.

Figure 15:
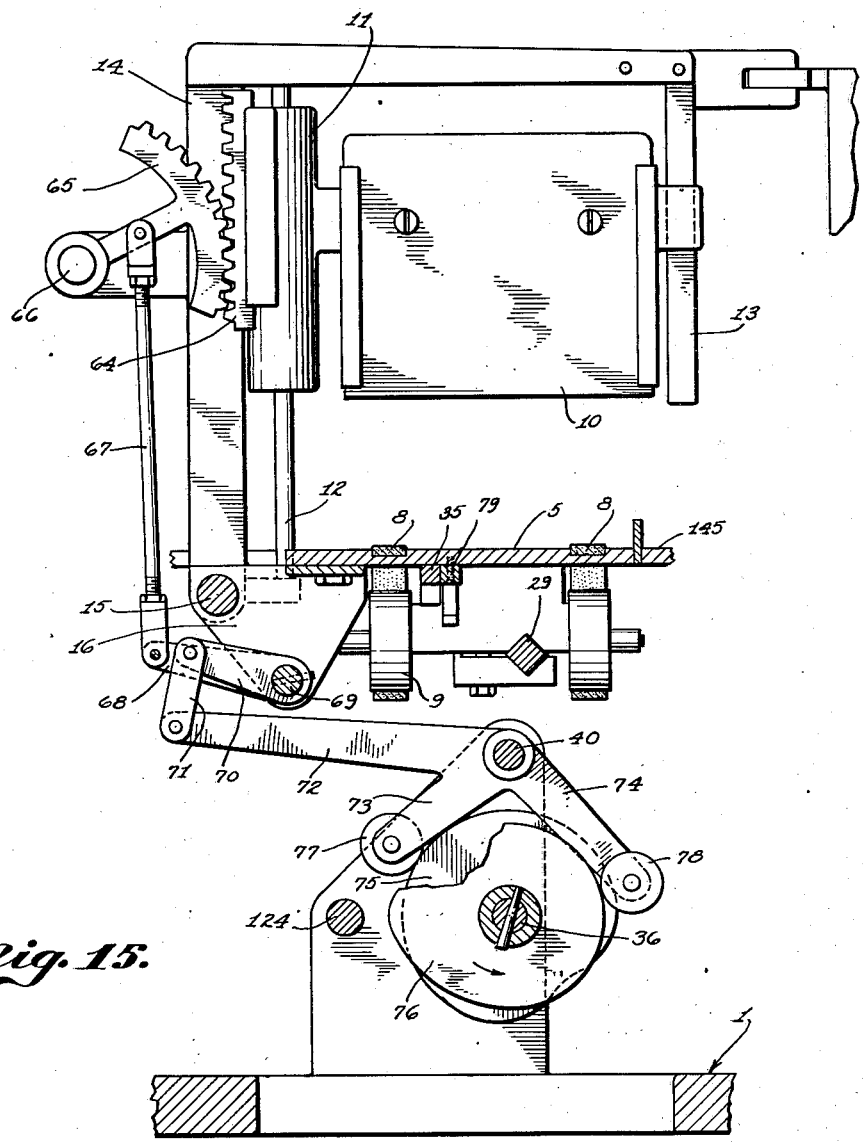
Fig. 15 is a vertical sectional view taken along line XV—XV of Fig. 5, illustrating the fractionating knife in its elevated position.

At the forward end of the table 5 is a fractionating knife 10, illustrated particularly in Figures 15 and 16 as being mounted for vertical reciprocation upon a knife carrier 11 slidably mounted upon a pair of bearing members 12, 13 secured to a supporting frame 14 which is rigidly secured upon a shaft 15 extending in parallel relation with the table 5. The shaft 15 is illustrated particularly in Figures 5 and 9 as being slidably supported in a bearing bracket 16 which is in turn rigidly secured to the underneath side of the slab table 5. A slab stop bar 17 is illustrated, particularly in Figures 3, 5, 9, 26, and 27, as being mounted in spaced relation to the knife 10 in the direction of movement of the slab of butter along the slab table 5, the stop bar 17 being illustrated particularly in Figures 26 and 27 as secured by springs 18 to a pair of upstanding arms 19 rigidly secured on a shaft 20 journaled for oscillating motion in a pair of frame members 21 and 22, rising from the main table 1.

In the embodiment of the machine shown herein, the fractionating mechanism is adapted to equally divide a 2½ pound slab of butter into ten equal parts, and the normal spacing of the stop bar 17 from the knife 10 should be just equal to $\frac{1}{10}$th of the maximum length of a 2½ pound slab so that when the slab of butter is moved along the table 5 up against the stop 17, the knife 10 will be properly aligned above the slab so that when the knife 10 is moved downwardly it will separate $\frac{1}{10}$th of the slab, thus providing a block or unit of butter containing exactly ¼th pound. However, as will be understood by those skilled in the creamery art, the slabs of butter as usually formed, though weighing 2½ pounds, may not all be of exactly the same length or of exactly the same cross-section, so that while one slab may have the maximum length of 16¼ inches, another slab, weighing 2½ pounds, may, by reason of a slight deformation of the shape of the slab or from some other well-known cause, be slightly less than 16¼ inches in length, so that should the normal spacing of the stop bar 17 from the knife 10 be 1⅝ inches, successive cuts made by the knife 10 would not accurately separate quarter pound sections from the slab.

I arrange my fractionating mechanism, however, to automatically adjust itself for such variations in length of the butter slab by mounting the knife 10 to slide in the direction of the movement of the butter slab, by mounting the stop bar 17 for movement in a direction opposite to the movement of the slab of butter, and by arranging the driving mechanism for moving the butter slab to automatically move the stop bar 17, rearwardly, and the knife 10 forwardly by distances exactly equal to 1/20th of the variation of the slab from its normal or extreme length.

In Fig. 4 I have diagrammatically illustrated a butter slab 23 which is assumed to be a 2½ pound slab of butter having a maximum length indicated by the arrow X. Thus when the slab 23 is pressed up against the stop bar 17 (indicated by the line 17 in Fig. 4), the normal spacing of the knife 10 (indicated by the line 10 in Fig. 4), will be rearwardly of the stop bar 17 by $\frac{1}{10}$th of the distance X. However, if the slab 23 is of less than the normal length X the difference in length of the slab 23, must be equally divided into ten parts so that the slab will be evenly divided into ten parts, each of which is just equal to $\frac{1}{10}$th of the total length of the slab. Thus by shifting the stop bar 17 toward the right-hand side in Fig. 4 by a distance equal to 1/20th of the difference between the length X of a normal slab and the length (indicated by line 24) of a smaller slab, and by shifting the knife 10 to the left, as viewed in Fig. 4, by a distance equal to 1/20th of the difference in the length of the slab, adjustment will have been made to accurately and evenly divide the shorter slab into ten equal parts. Thus, if the slab of butter, no matter what its length (within the limits for which the machine is designed), contains 2½ pounds of butter, each fraction cut by the knife 10 will be assured of containing one quarter pound, and/or $\frac{1}{10}$th of the overall length of the slab.

The operating mechanism for automatically adjusting the stop 17 and the knife 10 by the correct distance, is illustrated particularly in Figs. 5 through 12, wherein a primary butter pusher 25 is secured upon the end of a plunger 26 which is in turn mounted upon a bracket 27 extending above the slab table 5. The bracket 27 extends over the left-hand edge of the table 5, as illustrated in Fig. 5, and is bent downwardly to be secured to a T-shaped plate or pusher carriage 28 slidably mounted upon a pusher supporting rod 29 extending longitudinally below the table 5 and parallel therewith.

By referring particularly to Figures 6, 7, 10, 11, 12, and 13, it will be observed that the primary pusher carriage 28 is recessed so as to fit the squared cross-section of the pusher support rod 29 so that while the carriage 28 is slidable upon the rod 29, it is held against rotation therearound, suitable gibs 30 being employed upon the lower surface of the rod 29 to form a complete bearing between the rod 29 and the carriage 28. The carriage 28 is normally retracted to its rearmost position, as shown in Figs. 5 and 6, by means of a counterweight 31 connected to the carriage 28, as by means of a cord or cable 32 trained over a pulley 33 so as to normally urge the carriage 28 and the pusher 25 to the rearmost position.

The pusher 25 constitutes the driving mechanism which engages the butter slab and moves the same along the slab table 5 and is arranged to be driven forwardly along the table 5 in ten successive steps by means of drive mechanism which includes a drive bar 35 extending longitudinally of the slab table 5 and mounted for longitudinal reciprocation relative to the slab table 5.

The drive bar 35 is arranged to be reciprocated by power mechanism the driving operations of which are illustrated particularly in Figs. 5, 9, and 13, as including a main power shaft 36 to which is rigidly secured a cam 37 engaging a roller 38 mounted in the end of one arm of a bell crank 39 pivoted upon a supporting shaft 40, the other end of the bell crank being connected by means of a link 41 to a crank 42 which is in turn rigidly secured to a second crank 43 as by means of a stub shaft 44 journaled in a bearing frame 45 mounted on the main table 1, the upper end of the crank 43 being connected by a link 46 to an angle bracket 47 secured to the side of the drive bar 35.

By referring particularly to Figs. 5 and 9 it will be observed that the crank 43 is normally urged forwardly, (that is, in the direction of movement of the slab of butter over the table 5), by means of a tensioned spring 48, one end of which is secured to the crank 43 and the opposite end of which is secured to some stationary part of the main table 1 or the frames connected thereto, as indicated herein, the connecting being made to a cross bar 49 secured to the frames 21 and 22.

By referring particularly to Fig. 13 it will be observed that the cam 37 is of such shape and is so mounted upon the shaft 36 that at the beginning of the cycle of operations of the "fractionator" the roller 38 will be resting upon the "high level" of the cam 37 to hold the drive bar 35 in its rearmost or retracted position. Then, as the shaft 36 is driven in the direction of the arrow appearing thereon in Fig. 13, the roller 38 will engage the "low point" of the cam 37 permitting the spring 48 to move the drive bar 43 forwardly while during the remainder of the complete rotation of the shaft 36 the drive bar 35 will be retracted and held in its rearmost position until the next revolution of the shaft 36.

By referring particularly to Fig. 7 it will be observed that the drive bar 35 is provided with a plurality of spaced notches 50 distributed along the length thereof, there being one notch for each of the ten cuts to be made in the 2½ pound slab of butter, the spacing of the notches relative to each other being slightly in excess of the distance between successive cuts to be made in the slab.

The pusher carriage 28 is provided with a pawl 51 normally urged upwardly into contact with a drive bar 35 and engaging in one of the notches 50 when such notch is aligned with the end of the pawl 51. Thus at the start of the cycle of operations of the fractionator, rotation of the shaft 36 allows the spring 48 to move the drive bar forwardly carrying the pusher carriage 28 and the pusher 25 forwardly until the pusher 25 engages the end of the butter slab and presses the same forwardly along the slab table 5 until the forward end of the slab of butter engages the stop bar 17. By properly selecting the strength of the spring 48, positive movement of the butter into engagement with the stop bar 17 may be obtained without deforming the ends of the slab by their contact with either the stop bar 17 or the pusher 25.

By referring particularly to Figs. 5, 6, and 9, 10 and 11, it will be observed that a short rod 53 is slidably mounted in bearings 54 upon the underneath surface of the slab table 5 and has depending therefrom a pawl 55 at the end of which is provided with a semicircular notch 56 normally aligned with a laterally extending pin 57 secured to the pusher carriage 28 so that upon the initial forward movement of the pusher 25 to engage the end of the butter slab and to press the same into engagement with the stop bar 17, the pin 57 will be brought into engagement with the pawl 55.

The normal location of the rod 53 is in its rearmost position so that if the slab of butter is of the predetermined length X, as shown in Fig. 4, the pusher carriage 28 will be stopped by the engagement of the butter slab with the stop bar 17 just after the pin 57 engages the notch 56 of the pawl 55, and will cause only a minute forward movement of the rod 53. However, if the slab of butter, by reason of its distortion, or for any other cause, is shorter than the distance X, the pusher carriage 28 will have moved a greater distance before the pusher 25 has moved the butter into contact with the stop bar 17.

By referring particularly to Figs. 5 and 9, it will be observed that the rod 53 has its forward end bent at right angles to the body of the rod 53 and has secured thereto a pin 58 which engages in a slot 59 in the end of one arm of a bell crank 60 which is pivoted at 61, the other arm of which extends laterally to engage the end of the shaft 15 upon which the cutting knife 10 is mounted. It will also be observed that the slot 59 extends angularly with respect to the movement of the rod 53, so that when the rod 53 is moved any appreciable distance forwardly by engagement of the pusher carriage 28 therewith, the bell crank 60 will be slightly rotated about its pivot to press the shaft 15 forwardly and thus shift the knife 10 forwardly toward the stop bar 17.

By properly designing the angle of the slot 59 and the length of the arms of the bell crank 60, the forward movement of the shaft 15 and the knife 10 may be arranged to be exactly 1/20th of the movement of the rod 53 when the same is moved by the excess movement of the carriage 28 in its initial pressing of a short length of butter against the stop 17.

By referring particularly to Figs. 5 and 9, it will be observed that the knife frame 14 has a link 62 connected thereto, the opposite end of which engages a crank 63 on the shaft 20 which supports the stop bar 17, so that forward movement of the knife 10 is accompanied by a rearward movement of the stop bar 17, the amount of movement of the stop bar 17 being designed to be 1/20th of the overrun of the pusher carriage 28 when it is moved into engagement with a short slab of butter. Thus the stop bar 17 and the knife 10 are moved toward each other a total distance, properly dividing the overrun of the carriage 28 into ten equal parts, thus accurately setting the knife and the stop to equally and evenly divide the short length of butter into ten equal parts, each of which will contain 1/10th of the total length of the slab of butter. Thus all that is necessary to insure accurate weight in each of the fractions of the slab formed by the fractionator is to weigh the original slab of butter to be sure that it weighs 2½ pounds and then each of the sections cut by the fractionator will equal one quarter pound.

After the knife 10 and the stop 17 have been automatically adjusted, as hereinbefore described to accurately divide the butter slab into ten equal parts, further operation of the machine will cause the knife 10 to cut the first section or fraction from the butter slab and when the cut section has been moved out of the way the remainder of the slab is fed forwardly over the slab table 5 to again abut the stop 17 and a second cut is made, and this operation is repeated until the entire slab has been divided into its fractions.

Figure 16:
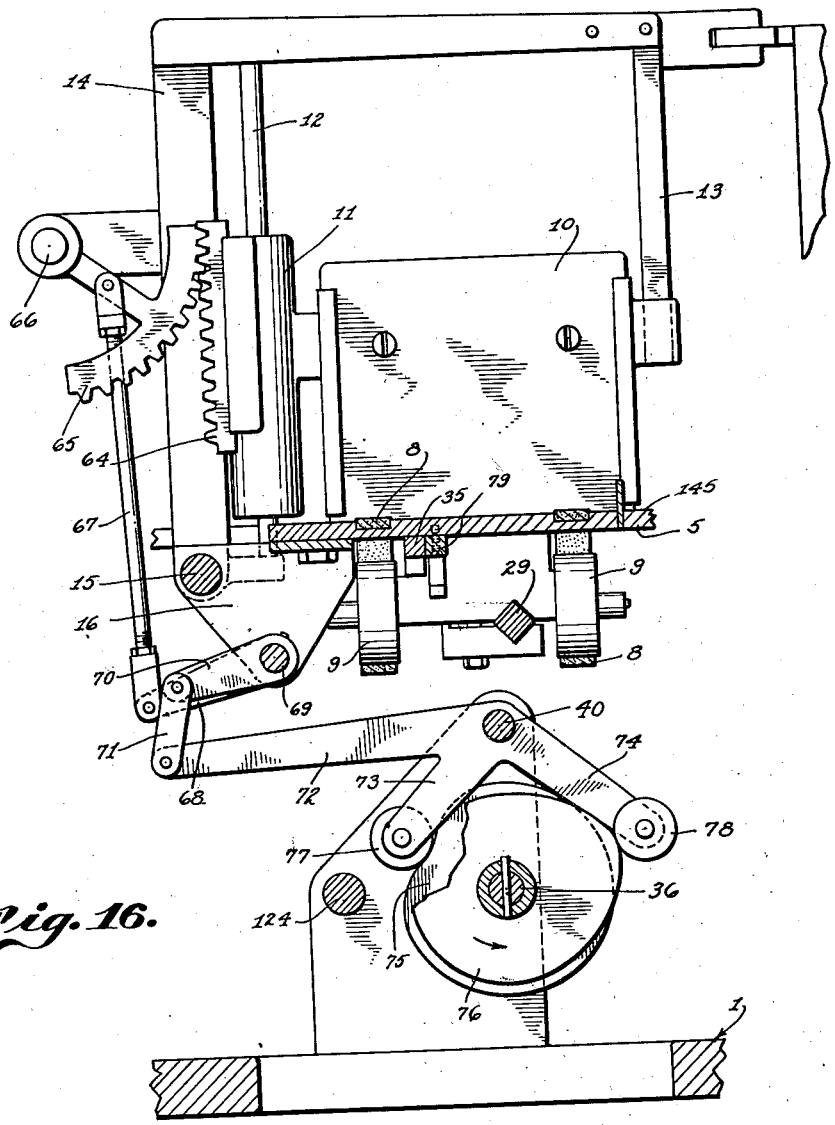
Fig. 16 is a detail view, similar to Fig. 15, illustrating the fractionating knife in its lowermost position.
Figure 40:
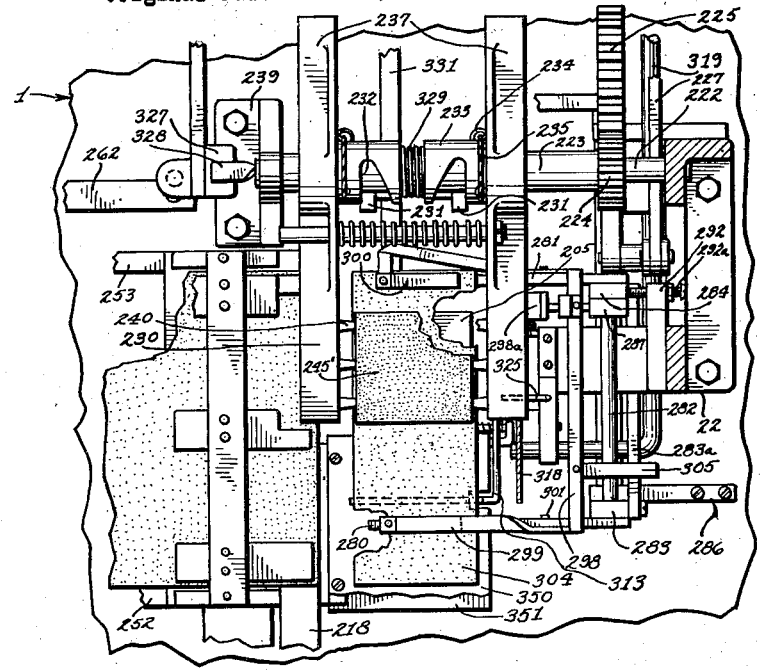
Fig. 40 is a top plan view of the wrapping table and the transfer mechanism.
Figure 41:
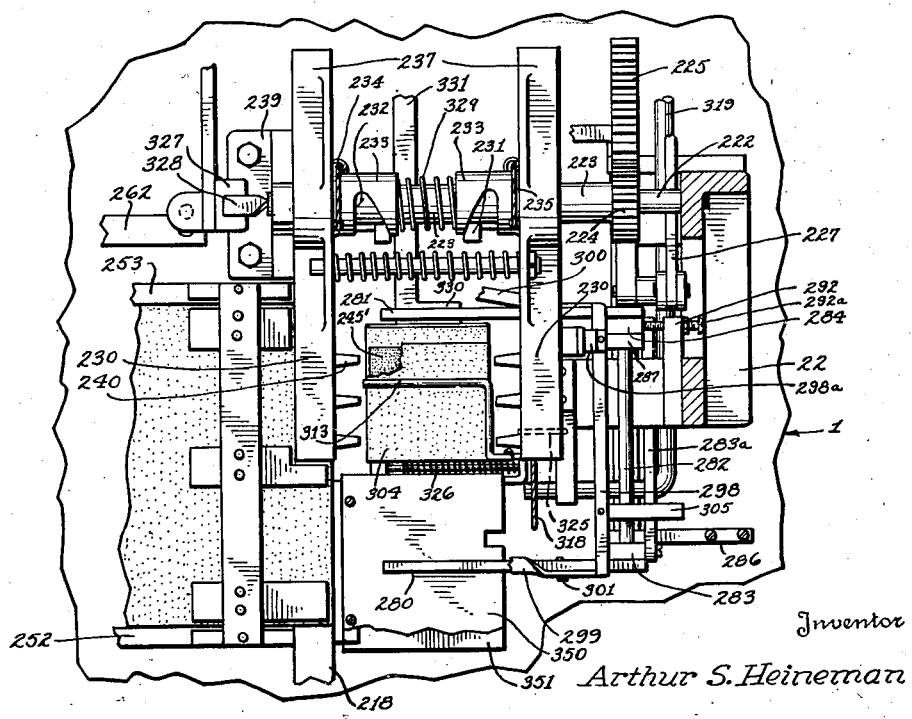
Fig. 41 is a view similar to Fig. 40, illustrating the transfer fingers disengaged from the individual serving and after the serving has been placed upon the wrapping table.

By referring particularly to Figs. 15, 16 it will be observed that the knife carrier 11 is provided upon one side thereof with a gear rack 64 engageable by a gear segment 65 pivoted at 66. The gear segment 65 is connected by a link 67 to a crank 68 rigidly secured to a shaft 69 having a second crank 70 mounted thereon and connected by a link 71 to the outer end of a rocker arm 72.

The rocker arm 72 is illustrated as being pivoted upon the same supporting shaft 40 which pivoted the bell crank 30, the rocker arm 72 having a pair of branch arms 73 and 74 extending on opposite sides of the shaft 36. The shaft 36 (which is the main power shaft of the fractionator portion of the machine) is provided with a pair of spaced cams 75 and 76, the cam 75 engaging a roller 77 on the end of the branch arm 73, while the cam 76 engages a roller 78 in the end of the branch arm 74. Thus upon one complete rotation of the shaft 36 from its normal position, as shown in Fig. 15, the cam 76 will first move the rocker arm 72 downwardly to draw the gear segment 65 downwardly and cause the knife 10 to descend and cut through the slab of butter in place against the stop bar 17, while during the later portion of the single revolution of the shaft 36, the cam 75 will engage the roller 77 and will swing the rocker arm upwardly to lift the knife 10 back to its normal position as shown in Fig. 15. Fig. 15 illustrates the normal position of the knife, shaft and cams with the knife in elevated position, while Fig. 16 shows the knife, shaft and cams when the shaft 36 has been rotated through one-half of its revolution, and by comparing Figs. 15 and 16 it will be observed that the shape and relative location of the cams 75 and 76 is such that during the first half of the revolution of the shaft 36 the downward movement of the knife is accomplished, while during the remaining half of the revolution of the shaft 36 the lifting operation occurs.

By referring particularly to Figs. 13 to 15, and 16, it will be observed that the location of the high and low surfaces of the cams 37, 75 and 76, relative to each other, is such that upon the initial rotation of the shaft 36 the slab of butter, which has been placed in the machine, will be moved forwardly into contact with the stop bar 17 prior to the downward movement of the knife 10 and that, at just about the time the knife 10 starts to move downwardly the high surface of the cam 37 will be presented to the bell crank 39 to start the rearward movement of the drive bar 35, thus relieving pressure on the butter during the time that the knife is making the cut. Also, due to the fact that the material for which the machine is designed, namely butter, is somewhat plastic and may tend to adhere to the pusher 25 and be drawn rearwardly by the rearward movement of the pusher, it may be desirable to secure the pusher on its carriage 28 by means of springs 34 of such light material as to exert a force less than the resistance to movement of the last quarter pound fraction of butter so that while the carriage 28 may move rearwardly, the pusher 25 may remain in contact with the end of the slab.

By referring particularly to Fig. 6, it will be observed that upon the first forward movement of the drive bar 35 to press the butter slab into initial contact with the stop bar 17, the pawl 51 will be engaged in the most rearward notch 50 on the drive bar 35.

Again by referring particularly to Figs. 5 and 7, it will be observed that a stationary bar 79, having a shape substantially identical with the drive bar 35, is rigidly secured to the underneath side of the slab table 5 and is provided with a plurality of notches 80 therein spaced along the length of the table 5 by distances substantially equal to the spacing of the notches 50 on the drive bar 35.

By referring particularly to Fig. 12, it will be observed that the pusher carriage 28 is also provided with a second pawl 81 in line with the lower surface of the stationary bar 79 so that when the pusher carriage 28 has been moved forwardly as a result of the initial forward movement of the drive bar 35, the pawl 81 will have been moved a slight distance in advance of the notch 80 on the bar 79. Thus upon the first portion of the retractive movement of the drive bar 35, the pawl 81 will be drawn back until it engages with the notch 80 and is held by the bar 79 to prevent further retraction of the pusher carriage 28, even though the drive bar 35 is moved further rearwardly to its extreme position as shown in Fig. 6. Thus it will be observed that the pusher 25 first moves the slab into contact with the stop bar 17 and then the pusher is slightly retracted from the end of the butter slab during the cutting operation of the knife 10 and also that the retraction of the pusher is but a slight distance to the rear of the end of the butter slab.

By referring particularly to Figs. 6, 10 and 11, it will be observed that when the pusher carriage 28 is in its rearmost position prior to the start of the operations of the machine, the rod 53 will be in its rearmost position and the pawl 55 will be in abutting relation with an angle plate 82 mounted upon the underneath side of the carriage 25. The pawl 55 is provided with a small notch 83 so shaped that when it is in engagement with the angle plate 82 the pawl 55 will be held in the position shown in Fig. 6, with its notch 56 aligned with the pin 57. Upon the initial forward movement of the pusher carriage 28 either the minute distance if the slab measures the maximum length X, or a greater distance if the slab is short, the pawl 55 will be moved forwardly a sufficient distance to release the pawl 55 from the angle plate 82 and a spring 84 will swing the pawl 55 upwardly out of the path of further movement of the pin 57. It will be observed that the upward movement of the pawl 55, however, can not occur until the first retraction of the pusher carriage 28 occurs when the first cut is to be made.

Therefore, succeeding forward and rearward movements of the drive bar 35 will move the butter carriage 28 to successive forward positions without occasioning further movement of the adjusting rod 53. Thus after completion of the first cut by the knife 10, a second rotation of the shaft 36 will allow a second forward movement of the drive bar 35 by its spring 48, at which time the pawl 51 on the pusher carriage 28 will be in engagement with the second notch 50 in the drive bar 35 and by this means the pusher carriage 28 will be moved forwardly to engage the rear end of the remaining slab of butter and press the same forwardly until the opposite end of the remaining slab again contacts the stop bar 17. The continued rotation of the shaft 36 will again retract the drive bar 35, allowing the pawl 81 to engage the second notch 80 on the pusher bar 79 to hold the carriage 28 from further retraction, while the drive bar is again retracted a sufficient distance to align the third of its notches 50 with the pawl 51. These operations will be repeated until ten cuts have been made by the knife 10, the last operation of the knife merely passing the knife behind the rear end of the butter slab downwardly across the face of the pusher plate 25, cleaning the plate 25 of excess or deposited butter and preventing accumulation that might become attached to succeeding slabs and cause overweight while at the same time preventing loss of weight on last fractional cut from the slab.

As each quarter-pound section is separated from the slab, it will be moved transversely relative to the slab carriage 5, preparing for the next forward movement of the butter slab upon the subsequent operation of the drive bar 35. The transverse movement of the cut fractions of the butter is accomplished by mechanism shown particularly in Figs. 17, 18 and 19 and consists essentially of a secondary pusher 85 secured to a secondary pusher carriage 86 mounted for longitudinal reciprocation in a slot 87 extending transversely across the forward end of the slab carriage 5, the carriage 86 being held in place within said slot by suitable gibs 88.

The secondary pusher carriage 86 has formed on its lower surface, a gear rack 89 meshed with a pinion 90 which is in turn meshed with a gear 91 freely rotatable upon a shaft 92 and having a pin 91a extending laterally therefrom to be engaged by a crank 93 rigid upon the shaft 92. The shaft 92 is arranged to be driven by a pinion 94 rigid therewith and meshed with a gear segment 95 pivoted at 96. The gear segment is arranged to be oscillated in timed relation with the operation of the drive bar 35 and the knife 10 by connecting the gear segment 95 through a link 97 to one end of a rocker arm 98 also pivoted upon the shaft 40 and having at its outer end a roller 99 engageable with a cam 100 mounted upon the main power shaft 36.

By referring particularly to Fig. 17 it will be observed that at the beginning of the cycle of operations of the drive bar 35 and the knife 10, the high and low points on the cam 100 are so arranged that the secondary pusher 85 will not be moved until the knife 10 has completely severed the fraction from the butter slab, but that while the drive bar 35 is retracted preparatory to a second forward movement of the butter slab, the cam 100 will have been moved to the position shown in Fig. 18 to move the rocker arm 98 downwardly and to move the shaft 92 through the pinion 94 and the crank 93, to rotate the gear 91 and thus drive the secondary pusher carriage 86 with its pusher 85 toward the right, as viewed in Figs. 17 and 18. Thus as each quarter-pound is cut from the slab, the cut section will be transferred instantly out of alignment with the remainder of the butter slab.

By referring to Figs. 17 and 18 particularly, it will be noted that the high point of the cam 100 engages the roller 99 for a relatively short space of time so that as soon as the quarter-pound section has been transferred out of alignment with the butter slab, the rocker arm 98 is allowed to descend, retracting the arm 93 and freeing the secondary pusher 85, which may be drawn back toward the left by any suitable means, ready to receive and transfer the second quarter-pound section when it is cut from the slab.

The secondary pusher 85 may be retracted by any suitable means, such as a counterweight 101, (see Fig. 1) connected by means of a cable 102 to the secondary pusher carriage 86.

When the last or tenth operation of the knife 10 occurs, the primary pusher carriage 28 should be released to allow it to be retracted ready for the insertion of a new butter slab and this is accomplished, as is illustrated particularly in Figs. 12, 17, 18, 19, 20, 26, and 28.

Referring particularly to Figs. 17, 18, 19, and 20, it will be observed that the crank 93, through which the secondary pusher carriage 86 is moved forwardly, extends beyond the circumference of the gear 91 to such position as will permit it to engage a release bar 103. The release bar 103 is pivoted at 104 and, as shown in Fig. 28, has its outer end engageable with a bell crank 105, one arm 106 of which is coupled by a link 107 to an arm 108 rigid upon a shaft 109 extending parallel with the path of movement of the secondary pusher 85 so that upon each forward drive of the secondary pusher 85 the shaft 109 will be rocked.

By referring particularly to Fig. 12, it will be observed that the pawl 81 on the pusher carriage 28 has a forwardly extending finger 110 secured thereto which, when the pusher 25 has moved the last portion of the butter slab past the knife 10, will lie immediately below a lever 111 secured to the rocking shaft 109. Thus when the rocking shaft 109 has been rocked by the movement of the secondary pusher pressing the last of the butter sections transversely of the butter slab carriage 5, the pawl 81 will be withdrawn from the notch in the bar 79.

By referring particularly to Figs. 6, 7 and 12, it will be observed that the drive pawl 51 on the pusher carriage 28 has a laterally extending finger 112 thereon lying immediately below the pawl 81, so that when the pawl 81 is moved downwardly by the lever 111 the pawl 81 will press the finger 112 downwardly and carry therewith the pawl 51, thus moving both pawls 81 and 51 down out of possible engagement with the notches 50 and 80 in the drive bar 35 and the stationary bar 79, respectively. It will also be observed from an inspection of Fig. 12, that the pawl 81 has an angular portion 113 thereof extending beyond the pivot pin 57 upon which it operates, which is sharpened to present a V-shaped end for engagement by a ball 114 normally pressed by a spring 115 into engagement therewith. Thus while during the forward movement of the pusher carriage 28 the pawl engages upon one side of the pointed end 113, the ball will engage upon the opposite side of the point 113 when the pawl 81 has been swung downwardly by the lever 111 and hence during the entire return movement of the pusher carriage 28 by its counterweight 31 the pawls 81 and 51 will be held out of possible engagement with the notches 50 and 80.

When the pusher carriage 28 has been returned to its extreme rearward position, the pointed end 113 of the pawl 81 will engage the front surface of the frame 116, (which is employed at the rear end of the slab table 5, as the mounting means for the bracket 27 and the pulleys 9) and the pawls 81 and 51 will be snapped back to their upward position ready to re-engage the notches 80 and 50 upon the subsequent operation of the machine. It may be desirable to employ a small spring 117 to normally urge the pawl 51 upwardly into engagement with the notch 50 of the drive bar 35.

As hereinbefore stated, the main power shaft 36, upon which the cams 37, 75, 76 and 100 are mounted, is arranged to be moved through one complete revolution upon the making of each cut or separation of each fraction from the slab.

The power shaft 36 may be driven by any suitable motor mechanism and clutch connections, (see Figs. 2 and 21) illustrated herein as including a motor 118, the pinion 119 of which drives a gear 120 secured to a stub shaft 121 having a pinion 122 thereon meshing with a gear 123 which is rigid upon a shaft 124 extending longitudinally below the slab butter table 5 and preferably parallel therewith. The shaft 124 has a pinion 125 thereon meshed with a gear 126 rigidly secured to a driving clutch plate 127 forming a part of a pin clutch of which the driven plate 128 may be employed therewith by means of a pin 129.

As illustrated particularly in Figs. 21 and 25, the driven plate 128 is rigidly connected to the shaft 36 so that whenever the clutch 127, 128 and 129 is engaged the shaft 36 will be driven by the motor 118. The clutch pin 129 extends slightly beyond the clutch plate 127 into a position to be engaged by a clutch operating lever 130 having a cam surface thereon such that when the lever 130 is in the position shown in Figs. 21 and 25 the pin 129 will be held out of engagement with the notches 131 in the driving plate 127. The clutch operating lever 30 is normally urged to the dotted line position shown in Fig. 22 by means of a clutch operating rod 132 normally urged to clutch releasing position by means of a spring 133.

By referring particularly to Figs. 2, 3, 21 and 24 it will be observed that a clutch operating handle 134 is pivoted to the main table 1 as at 135 and extends upwardly along the side of the slab table 5 at about the mid point thereof. By referring particularly to Fig. 21, it will be observed that the clutch operating handle extends immediately above the clutch operating rod 132 in such position as to engage behind a collar 136 on the rod 132 when the rod 132 has been moved rearwardly against the force of the spring 133 and thus will operate to lock or hold the clutch 12, 7, 8 and 9 in released position.

While throughout the foregoing description it was assumed that the commodity to be cut was butter, it will be apparent that any other similar material may be divided into a number of equal portions by means of the driving, cutting and transferring mechanisms set forth, and also that while it has been assumed that the butter was to be supplied to the machine in 2½ pound slabs to be divided into ten equal quarter-pound units, the apparatus may be readily adapted to handle slabs of different quantities and that by changing the arrangement of the notches 80 and 50, any desired number of equal fractions may be separated from the slab.

Subdivider B

After the quarter-pound sections have been separated from the slab, as hereinbefore described and have been transferred out of alignment with the slab by means of the secondary pusher 85, they may be cut or subdivided into small individual servings ready for wrapping and packaging.

The subdividing mechanism indicated generally at B includes a subdividing cutter or wire cutter 137 illustrated particularly in Figs. 31, 32 and 33, has a wire secured tautly across a pair of downwardly extending arms 138 and 139 formed upon a wire cutter carrier 140, the wire cutter 137 being stretched between a pin 141 on the arm 139 and a hook 142 adjustably mounted in the wire cutter carrier 140. The wire cutter carrier 140 is secured upon a cylindrical member 143 which is mounted for vertical reciprocation upon a bearing rod 144 mounted in the frame 22. The wire cutter 137 is mounted immediately above the end of a transverse extension 145 of the slab table 5 and may be formed as an integral part of the slab table 5 or may be formed as a separate transverse table mounted in alignment therewith.

The wire cutter carrier 140 is arranged to be vertically reciprocated by means of a gear rack 146 meshed with a gear segment 147 pivoted at 148 and having a link 149 connected therewith secured to the end of a rocker arm 150, the other end of which is provided with a roller 151 engaging a cam 152 mounted upon a secondary power shaft 153 so that upon a single rotation of the secondary power shaft 153 the rocker arm 150 will be drawn downwardly to move the wire cutter 137 downwardly toward the transverse table 145 and cut into individual servings from the end of a quarter-pound section which has been moved into place thereon by the secondary pusher 85. The return or elevating movement of the wire cutter 137 is accomplished by means of a spring 154 secured between the top member 155 of the frame 22 and the pin 156 which constitutes the connection between the link 149 and the gear segment 147. The member 143 is illustrated as being located upon a side of the wire cutter carrier 140 and the opposite side of the carrier 140 may be guided in its vertical movement by the engagement of an extension 157 thereof mounted in sliding engagement with a guide plate 158 secured to the frame 22.

As hereinbefore described, it is desirable that the quarter-pound section shall be divided into individual servings which may be of any desired thickness, formed by merely cutting slices from the end of the quarter-pound section as it is fed to the wire cutter 137 by the secondary pusher 85. In order, however, to determine the number of cuts and the sizes of the individual cuts or servings which will be made from the quarter-pound section, I provide a secondary driving mechanism for the secondary pusher 85, which secondary drive is illustrated particularly in Figs. 26, 27, 28, 29, and 30, and includes a ratchet 159 secured to a stub shaft 160 rotatably mounted in a vertical member 161 of the frame 21 secured between the main table 1 and the transverse table 145. The stub shaft 160 is rigidly secured to the pinion 90 which is meshed with the gear rack 89 on the secondary pusher carriage 86. The ratchet 159 is arranged to be rotated in a step-by-step motion by means of a ratchet pawl 162 illustrated particularly in Figs. 26 to 30 as pivotally mounted upon a shaft 163 and normally urged toward the teeth of the ratchet 159 by means of a torsion spring 164. The shaft 163 is supported at one end of a pair of levers 165 and 166, which are pivoted upon the shaft 160, the lever 166 having its outer end extending beyond the pivot shaft 160 and connected by a link 167 to the end of a rocker arm 168 which is in turn pivoted upon the shaft 40 and has at its outer end a roller 169 engageable with a cam 170 secured to the secondary power shaft 153.

Thus upon each rotation of the secondary power shaft 153 the cam 170 will operate the rocker arm 168 to swing the pawl 162 to rotate the ratchet 159 one step in a counterclockwise direction and thus rotate the pinion 90 a sufficient distance to advance the secondary pusher 85 to press the quarter-pound section of butter the proper distance beyond the plane of movement of the wire cutter 137 so that upon the next descent of the wire cutter the proper individual serving will be cut therefrom.

In the embodiment of the machine shown herein, the ratchet 159 is arranged to be stepped by its pawl 162 in twelve successive steps so that the quarter-pound section of butter will be moved past the cutter 137 to form twelve individual servings therefrom though it will be understood that by substituting ratchets having a different number of teeth for the ratchet 159 any desired number of individual cuts may be formed from the quarter-pound section.

It will also be observed that since the cam 170 is mounted upon the same secondary driving shaft as mounts the cam 152, the downward movement of the cutting wire 137 may be so coordinated that the forward movement of the secondary pusher 85 with the cuts will take place alternately with the transverse feeding or advancing movement of the secondary pusher.

It is of considerable importance that in order to properly form the last serving from the quarter-pound section that the last serving should be somewhat thicker than the servings which are made from the remainder of the quarter-pound section, as slight deformation of the shape of the quarter-pound section might otherwise leave the end serving too thin to be a suitable single serving. It is desirable that all the individual services so packaged be of such thickness that each piece is suitable for an individual service, and that if there should be any deformation of the sides of the original slab, which become the ends of the quarter-pound fractions, such deformation shall not result in an unsuitably first or last service as cut from its quarter-pound fraction by the wire cutter 137. For this purpose I have illustrated the ratchet 159 as having a plurality of teeth, thirteen in number, the first tooth to be engaged by the pawl 162 being indicated by the reference character 159a in Fig. 28 which, as will be observed, is spaced from the next tooth 159b by a distance which is so predetermined that the forward movement of the ratchet 159 under the influence of the pawl on the first actuation thereof will move the secondary pusher 85 a predetermined distance to position the end of the quarter-pound section under the wire 137 to form the first wide or thick cut, while the spacing of the remaining teeth gradually diminishes until the sixth cut is made and then gradually increases until the last two teeth 159c and 159d are approximately the same distance apart as the teeth 159a and 159b, thus insuring that upon making the last cut the remainder of the quarter-pound section will be moved forwardly a considerably greater distance than during the time the intermediate cuts were made and providing a larger section at the end of the division of the quarter-pound section into its individual servings. By arranging the teeth as illustrated herein, the operating mechanism for moving the pawl 162 forwardly upon the making of each cut, may be arranged to move the pawl to exactly the same distance each time and the spacing of the teeth on the ratchet 159 will properly proportion the individual servings which are cut from the quarter-pound section.

In order to prevent retractive movement of the ratchet 159 when the pawl 162 is retracted, ready for the next forward movement, I provide a secondary pawl 171 which may be pivoted upon the same shaft on which the arm 106 rotates, and which is normally spring-pressed into engagement with the teeth of the ratchet 159.

I find that it is desirable to provide some mechanism which will positively engage the rear end of the quarter-pound section of butter with the secondary pusher 85 during the time that the secondary pusher 85 is moving the butter forwardly to the subdividing wire cutter 137, and for this purpose I have illustrated particularly in Figs. 17, 18, and 38, the upper end of the secondary pusher 85 as extending rearwardly to form a pair of ears 172 in which is pivotally mounted a cross bar 173 from which extends a pair of wires 174, the lower ends of which are bent inwardly and project through openings 175 in the secondary pusher 85. The bar 173 is provided with a rearwardly extending arm 176 preferably formed of such weight that when this arm is free it will swing the bar 173 in a counter-clockwise direction, as viewed in Figs. 17 and 18, to press the pointed ends of the wires 174 through the openings 175 and into the rear end of a quarter-pound section of butter against which the secondary pusher 85 abuts. If desired, a small torsion spring 177 may also be employed to insure the movement of the wires 174. Thus through the agency of such pins or wires 174, the quarter-pound section of butter, and particularly the last serving thereof, is positively connected to the pusher 85.

By referring particularly to Fig. 18, it will be observed that when the secondary pusher 85 is in its rearmost position, that is, in position to receive a new quarter-pound section of butter from the knife 10, the pins or wires 174 should be withdrawn out of the path of the incoming quarter-pound section of butter and for this purpose I have illustrated an upstanding finger 178 as mounted on the stop bar 17 and projecting into the path of movement of the arm 176 when the secondary pusher 85 is moved to its rearmost position. However, upon the first forward movement of the secondary pusher 85 to slide the quarter-pound section of butter out of the way of the remainder of the slab, the pointed ends of the wires 174 will be moved into the end of the quarter-pound section, this movement being limited by a stop finger 179 secured to the cross bar 173, the lower ends of the stop member engaging a brace 180 on the pusher carriage 86.

It will also be observed that as the last serving is formed from the quarter-pound section of butter, the wire cutter 137 will move down behind the rear end of the remainder of the quarter-pound section, and at such time it will be necessary to have the wires 174 withdrawn from the remaining individual slice of butter. This is accomplished as is shown particularly in Fig. 38, wherein the wire-cutter carrier bearing 143 is illustrated as having the pin 181 thereon which, when the secondary pusher 85 is in position to hold the last individual serving of butter in line with the wire cutter 137, will be aligned with the rear surface of the arm 176, so that the downward movement of the cutter carrier 140 will cause the pin 181 to engage the arm 176 and swing the same forwardly, thus withdrawing the wires 174 out of the path of movement of the wire cutter 137 just as the wire cutter descends behind the last individual serving. After the last individual slice has been formed from the quarter-pound section, the secondary pusher carriage 85 should be released from its ratchet drive mechanism and allowed to return to its rearmost position, as shown in Fig. 17. This is accomplished as illustrated particularly in Figs. 26 and 27 and 28 by providing an extension 182 of the gear rack 89 with a laterally extending end 183 located in such position that as the pusher carriage 85 and the gear rack 89 is moved forwardly, the end 183 will engage an arm 184 on shaft 109 and will press shaft 109 (which has previously been described as being both rotatable and longitudinally slidable in its bearings) to a forward position as shown in Fig. 27, thus placing a laterally extending pin 185 thereon immediately below the hook end of a link 186 which may be arranged to be actuated by any moving part of the mechanism which is actuated after the last downward movement of the wire cutter 137 so that this last movement of the last cutter 137 will pull the link 186 downwardly and rock the shaft 109 so as to press, through the link 107 the extending arm 106, as shown in dotted lines in Fig. 28.

The arm 106 may be formed as an integral part of the pawl 171 so that downward movement of the arm 106 will withdraw the pawl 171 out of the path of movement of the teeth of the ratchet 159 and as is illustrated particularly in Fig 28, rearward movement of the pawl 171 will cause it to engage the pawl 162 and also move this pawl out of the path of movement of the ratchet 159 and thus release the ratchet allowing the counterweight 101 to draw the secondary pusher 85 back to its rearmost position as shown in Fig. 17.

When the mechanism for cutting the quarter-pound sections into the individual servings is combined with the mechanism herein described for severing the butter slab into quarter-pound sections, and into individual servings, the operation of cutting each quarter-pound section from the slab should be alternated. As each quarter-pound section is cut from the slab it will be moved to the wire cutter 137 and cut into the individual slices and then the next quarter-pound section will be cut from the slab and it likewise will be cut into individual servings and the cycle of operations repeated until the 2½ pound slab has been sliced into individual servings. This may be readily arranged by coordinating the driving mechanism for the shaft 153 to operate alternately with driving operations of the drive shaft 36.

By referring particularly to Fig. 21, it will be observed that the shaft 153 extends from the forward end of the machine and is rigidly connected to a driven member 187 of a pin clutch corresponding in all respects to the pin clutch 127, 128 and 129 described for the shaft 36. The driven member 188 of this second clutch is illustrated as being connected with the driven member 187 by means of a pin 189, the driving member 188 being rigidly connected to a pinion 190 meshed with a gear 191 on the power shaft 124, which is continuously rotated as hereinbefore described by the motor 118.

The clutch 187, 188 and 189, is arranged to be operated by a clutch operating lever 192, one end of which is arranged, as shown in Fig. 22, in the path of movement of the pin 189 so that when the lever 192 is in the position shown in full lines in Fig. 21, the pin 189 will be moved out of the slots 193 and will disconnect the clutch.

As was described with reference to the operation of the clutch 127, 128 and 129, the butter slab upon being placed on the slab table 5 will engage the clutch operating arm 134 and raise the same above the collar 136, allowing the spring 133 to move the clutch operating rod 132 to cause the lever 130 to move out of the way of the clutch pin 129, thus engaging the clutch 127, 128 and 129 to drive the shaft 36.

When the fractionating mechanism is to be combined with the subdivider in the same machine, the power shaft 36 should be driven only through one complete revolution to sever one of the fractions or one quarter-pound section from the butter slab and then should come to rest while the subdivider is slicing this first quarter-pound section into individual servings.

By referring particularly to Figs. 17, 18, 19, and 20, it will be observed that upon each forward movement of the secondary pusher 85 to press one quarter-pound section out of the way of the remaining butter slab, the arm 93 will be swung downwardly into engagement with the release bar 103 which operates the bell crank 105, moving the bell crank 105 to the right as viewed in Fig. 28. This movement of the bell crank 105 will cause the link 194 to be drawn to the right to rock the clutch operating lever 192 from the full line position, as shown in Fig. 21 to the dotted line position as shown in that figure, and the clutch operating lever 192 will be held in this new position by means of a spring 195 illustrated in Fig. 28 as a bow spring engaging the lower end of the bell crank 105 in such manner that when the bell crank 105 is swung to the right the spring 195 will move past "dead center" and will hold the bell crank 105 in that position while, when the bell crank 105 is moved to the left, the spring 195 will be swung over its "dead center" position to hold the bell crank 105 in the new position. Movement of the bell crank 105 also carries pawls 162 and 171 into engagement with notches 159a and 159b of ratchet 159 as shown in Fig. 29, preventing retraction of pusher 85 rearwardly as rocker arm 98 with roller 99 at high point of cam 100 begins to drop. In this position the fractional portion of the original slab has been moved forwardly to position ready for the first serving portion to be cut therefrom by subdividing wire.

By referring particularly to Figs. 21 and 22, it will be noted that the clutch operating lever 192 has an opening 196 therein through which the end of the clutch operating rod 132 projects, there being a cross pin 197 in the outer end of the clutch operating rod 132. Thus when the clutch operating lever 192 is swung to the dotted line position as shown in Fig. 21, the lever 192 will engage the pin 197 and draw the clutch operating lever 132 forwardly, thus moving the clutch operating lever 130 into position to engage the pin 129 and throw out the clutch 127, 128 and 129, stopping further movements of the shaft 36 at the end of its first complete revolution, while, at the same time, the movement of the clutch operating lever 192 will remove this lever from the path of the clutch pin 189 allowing the clutch 187, 188 and 189 to be engaged, thus transferring the driving power from shaft 36 to shaft 153. The shaft 153 will then operate through twelve complete revolutions to cause the feeding movement of the quarter-pound section of the butter and to cause the twelve cuts to be made by the cutting wire 137. At the end of the twelfth cut, the engagement of the link 186 with the pin 185 and the consequent rotation of the shaft 109 will, as hereinbefore explained, swing the bell crank 105 back to the dotted line position toward the left, as viewed in Fig. 23, and by this movement swinging the clutch operating lever 192 back to its full line position as shown in Fig. 21.

This latter movement of the clutch operating lever 192 will cause it to re-engage the clutch pin 189 throwing out the clutch 187 and 188 and 189 and the rearward movement of the clutch operating lever 192 will press against the spring 133 (the opposite end of which engages a pin 198), and through the spring 133 will move the clutch operating rod 132 rearwardly, causing the clutch operating lever 130 to allow clutch 127, 128 and 129 to re-engage and cause a second complete revolution of the shaft 36, thus alternating the operations of the shaft 36 through one complete revolution and the shaft 153 through twelve complete revolutions will be accomplished until the last individual serving is cut from the last quarter-pound section and the machine will be brought to rest, as follows:

As hereinbefore described, the operating handle 134 is arranged as shown in Fig. 24 to ride upon the clutch operating rod 132, but when the operating handle 134 is first actuated to release the collar 136 the operating handle 134 will be held in this elevated position by means of an "over-center" spring 199 and will therefore not be engaged behind the collar 136 until the operating handle 134 is again moved downwardly against the force of the spring 199.

Also, as hereinbefore described, upon the completion of the final cut by the fractionating knife 10, the butter pusher carriage 25 is released and is returned to its rearmost position. I employ this return movement of the butter pusher carriage 128 to forcibly swing the operating handle 134 back into collar-engaging position on the clutch operating rod 132.

By referring particularly to Fig. 8, it will be observed that the pusher carriage 28 has a pair of laterally extending ears 200 in which is pivoted a lever 201 normally urged to the position shown in Fig. 8 by means of a spring 202 so that a tailpiece 203 mounted on the opposite end of the lever 201 will lie in the path of a hook 204 mounted upon the vertically extending arm of the operating handle 134. Thus as the carriage 28 is moved forwardly (in the direction of the arrow shown in Fig. 8) the tail-piece 203 will ride past the hook 204 but upon the return movement of the carriage 28 the hook 204 will engage upon the opposite side of the tail-piece 203 as shown in Fig. 8 and will forcibly draw the operating handle 134 to the right, that is, back toward the position shown in Fig. 24, re-engaging the clutch operating handle 134 with the collar 136.

It will be noted, however, that at the time the clutch operating handle 134 is swung downwardly to re-engage the collar 136, the clutch operating rod 132 will be in the forward position, as shown in Fig. 21, since the mechanism which causes the release of the pusher carriage 28 is operated simultaneously with the forward movement of the clutch operating rod 132. Thus upon the completion of the twelfth cut made by the wire cutter 137, and the subsequent rearward movement of the clutch operating lever 192, the clutch operating rod 132 is prevented from being moved rearwardly thereby, and the clutch operating lever 192 will throw out the clutch 187, 188 and 189 without re-engaging the clutch 127, 128 and 129, the lever 192 at this time pressing the spring 133 preparing the machine for starting a new cycle of operations when a new slab of butter is placed thereon to again operate the clutch operating handle 134.

*Wrapping and packaging mechanism*

The quarter-pound sections of butter may be cut into as many individual servings as desired, which may be taken out of the machine as they are cut, and stored or packaged in any desired manner, or my machine may include an automatic wrapping and packaging mechanism shown particularly in Figs. 34 to 58, inclusive.

By referring particularly to Figs. 40, 41, 45, and 46, it will be seen that adjacent the forward end of the subdivider B there is mounted a butter wrapping table 205 upon which each individual slice or serving of butter may be placed ready for wrapping, as will be hereinafter more fully described.

It will be noted that the butter wrapping table 205 is mounted upon the upper end of a T-shaped member 206, the lower end of which is pivotally mounted at the outer end of a crank 207 rigidly secured to a stub shaft 208 which is in turn rotatably mounted in an upstanding bearing member 209 supported upon the main table 1. The shaft 208 is provided with a second crank 210 connected by means of a link 211 to the outer end of a rocker arm 212 having a roller 213 engaging a cam 214 mounted upon the shaft 153 so that the table 205 may be moved from its normal elevated position as shown in Fig. 45 to a lowered position, as shown in Fig. 46, in synchronism with the operation of the wire cutter 137. It will be observed that one side of the wrapping table 205 has a downwardly extending flange 215 which rides against the arm 216 formed upon a bracket 217 supported as shown particularly in Fig. 54 upon a cross bar 218 mounted upon a paper carrier frame 219 (which will be more fully described hereinafter).

Referring again to Figs. 45 and 46, it will be observed that the lower end of the T-shaped member 206 is provided with a pin or screw 220, to which is secured one end of a spring 221, the opposite end of the spring being secured to a hook 222 mounted upon some stationary portion of the machine, such as the main table 1, and thus the paper wrapping table 205 will be maintained in its upright position rigid against the bracket 216.

As shown particularly in Fig. 1, the butter wrapping and packaging mechanism is located at a lower level than the subdivider mechanism B and as will be pointed out hereinafter, the automatic packaging mechanism which I employ requires that the individual slices of butter should lie horizontally as they are being packaged. For this reason I provide a transfer mechanism which will seize each individual serving of butter as it is cut by the wire 137 and transfer it from its vertical position as it is cut to a horizontal position upon the butter wrapping table 205.

By referring particularly to Figs. 34 to 43, inclusive, it will be observed that the frame member 22 has rigidly mounted therein a cross shaft 222 which constitutes a bearing member on which a sleeve 223 is rotatably mounted, one end of the sleeve 223 having a pinion 224 thereon meshed with a sector gear 225 connected as shown particularly in Fig. 42 by a link 226 to a rocker arm 227 pivoted upon the shaft 40 and having a roller 228 thereon engaging a cam 229 mounted upon the secondary power shaft 153.

The sleeve 223 constitutes also a bearing member upon which is mounted a pair of transfer arms 230 for both sliding and rotary motion relative to the sleeve. The sleeve 223 is provided with a pair of outstanding pins 231, each of which engages a cam surface 232 formed upon a boss 233 on the transfer arm 230. The transfer arms 230 are normally held in a vertical position, as shown in Figs. 34, 35, and 39, by means of a pair of tensioned springs 234, each of which is connected by a wire or cord 235 to a pin 236 mounted upon the respective arms 230 so that the arms 230 are held with their lower ends 237 abutting a stop bar 238 mounted upon a frame member 239 which may constitute the support for the shaft 222 opposite to the frame 21.

As will be particularly observed from an inspection of Fig. 42, the cam 229 has a high point thereon normally positioned immediately in front of the roller 228 so that the initial rotation of the shaft 153 (which also causes the initial downward movement of the wire cutter 137) will rotate the sleeve 223 rearwardly a slight distance, swinging the pin 231 from the position shown in Fig. 36 to the position shown in dotted lines in Fig. 37, at which time the transfer arms 230, abutting their stop bar 238, cannot rotate rearwardly and thus the pins 231 will ride down the cam surfaces 232 and draw the transfer arms 230 toward each other.

It will also be observed from an inspection of Figs. 34 and 35 that at this time the transfer arms 230 are aligned with the overhanging section of the butter slab 23 and on opposite sides thereof, so that a plurality of knife-like projections 240 will be pressed into the sides of this overhanging portion of butter just prior to the time the wire cutter 137 descends to slice this serving of butter from the quarter-pound section. Thus when the serving of butter has been severed by the knife 137, it will be supported upon the transfer arms 230. At about the time that the wire cutter 137 reaches its lowermost level, the cam 229 will have moved its high point past the roller 228, which action will have swung the sector gear 225 forwardly again to bring the pins 231 back into engagement with the forward end of the cam surfaces 232. Further rotation of the shaft 153 will therefore cause the roller 228 to ride down upon the low level of the cam 229 while at the same time a second cam 241 also mounted upon the shaft 153 will be moving this high level against a roller 242 secured to a secondary rocker arm 243 to raise this secondary rocker arm. It will be noted that when the last serving is formed, the last serving will be held by the wires 174 on the secondary pusher 85 until the projections 240 of the transfer arms 230 have entered the last serving and this serving is therefore prevented from being displaced.

By referring particularly to Fig. 42, it will be observed that the larger end of the rocker arm 243 engages an adjusting pin 244 on an angle bracket 245 secured to the rocker arm 227 and will lift the rocker arm 227 to swing the sector gear down into the position shown in Fig. 42 and thus by reason of the engagement of the pins 233 the transfer arms 230 will be swung from their vertical position to their horizontal position, transferring the butter serving from the vertical position as it is cut from the knife down to a horizontal position on top of the butter wrapping table 205. It will be noted that by reason of the adjusting screw 244, the downward movement of the arms 230 may be very accurately controlled and it is of importance that the butter serving 245' so transferred should just touch the table 205 prior to the final downward movement of the arms 230.

By this operation, the knife-like projections 240 will be pressed laterally of the side of the butter serving opening the holes in the butter serving into which these projections extend, rendering the projections free to be withdrawn from the butter serving without displacing the butter serving from its position on the wrapping table 205. It follows also that further rotation of the shaft 153 will reverse the movement of the sector gear 225, allowing the springs 234 to swing the transfer arms 230 back up to their vertical position ready to receive the next cut of butter.

By referring particularly to Figs. 34, 35, 36, and 37, it will be observed that a locking arm 246 is pivotally mounted at 247 upon one of the transfer arms 230 and extends transversely across the transfer mechanism past the opposite arm 230, the extreme end of the locking arm 246 passing through an angle plate 248 secured to said opposite arm 230. The locking arm 246 has a notch 249 formed therein adapted to receive the angle plate 248 when the transfer arms have been drawn together, as hereinabove described, to the position shown particularly in Fig. 37, there being a small leaf spring 250 on the arm 230 normally pressing the locking arm 246 outwardly therefrom. Thus after the initial movement of the pins 231 to draw the transfer arms 230 together, these arms will be locked in this inward position by the engagement of the notch 249 to the angle plate 240, holding the arms in this locked position until the individual serving of butter 245' has been laid upon the wrapping plate 205.

As illustrated herein, each individual serving of the butter is arranged to be wrapped in an individual paper wrapper, which is preferably placed on the wrapping table 205 immediately prior to the placing of the butter serving thereon by the transfer arms 230.

By referring particularly to Figs. 50, 51, 52, and 53, it will be observed that the roll of paper 251 is rotatably supported in a pair of upstanding arms 252—253, secured directly to the main table 1. The paper 251 is preferably of a width slightly in excess of twice the length of an individual serving of the butter so that as the paper is fed from the roll 251 by means of a pair of feed rollers 254, 255 sections may be severed therefrom by means of a knife 256 having a length substantially equal to the width of an individual serving of butter.

By referring particularly to Figs. 50, 51, 52 and 53, it will be observed that the feed roller 254 is arranged to be rotated intermittently by means of a ratchet 257 secured thereto and having a plurality of teeth engageable by a pawl 258 connected directly to a pinion 259 which is meshed with a sector gear 260 which is secured to a shaft 261. The shaft 261 has secured thereto a crank 262 coupled by means of a link 263 to a rocker arm 264 pivoted on the shaft 40 and having a roller 265 thereon engaged by a cam 266 mounted upon the secondary power shaft 153 so that the operation of the sector gear 260 will be coordinated with the movement of the wire cutter 137 and the transfer arms 230.

It will also be observed that the paper is fed from the rolls 251 over a guide roller 267, a tension release roll 268, a second guide roller 269 and an aligning roller 270 so that as the paper feed roller 254 is operated the paper is fed along a horizontal plane toward the paper table 205. The tension release roll 268 is illustrated as being mounted in a pair of arms 271 pivoted respectively to the upstanding arms 252, 253, having their midpoints coupled by means of a link 272 to a second crank 273 also secured to the shaft 261. It will be noted that by the interconnection of the cranks 262 and 273 on the shaft 261 that after the pawl 258 has moved the paper feed roller 254 to feed one length of the paper toward the paper table 205, the return movement of the pawl 258 to engage the next notch in the paper feed ratchet 257, the tension release spring 268 will be drawn downwardly thereby and a new set of paper from the paper roll 251 will be fed at the time when the feed roller 254 is stationary, thus insuring that little or no tension will be exerted upon the paper as it is moved by the feed roller 254.

Also, by referring particularly to Figs. 50 and 54, it will be observed that the paper cutter or knife 256 is mounted immediately adjacent the paper feed roller 254 upon the frame 218, which, as heretofore described, extends outwardly from and is supported by the vertically extending arms 252 and 253. The knife 256 is illustrated as being pivoted near one of its ends 274, one end of the knife extending downwardly as indicated at 275 to be connected by means of a link 276 to a rocker arm 277, pivoted on the shaft 40 and having a roller 278 engageable with a cam 279 mounted upon the secondary power shaft 153.

Thus upon forward feed of a predetermined length of paper by the feed roller 254 past the knife 256 the knife 256 will be actuated by its cam 279 to cut such predetermined length of paper ready for the paper table 205.

By referring particularly to Fig. 50 it will be observed that in order that there shall be no interference between the knife 256 and the butter wrapping table 205, I prefer to mount the knife 256 spaced somewhat laterally from the edge of the wrapping table 205 and to provide a paper transfer mechanism which will grasp the cut section of paper and carry the same forwardly from the knife 256 into accurately aligned position upon the wrapping table 205. For this purpose I have illustrated a paper transfer mechanism comprising a pair of arms 280 and 281, each of which is pivotally secured at one of its ends to a shaft 282 which extends along the side of the butter wrapping table 205 and is illustrated particularly in Figs. 40, 41, and 50 as being supported in the upper end of a pair of links 283 and 284.

By referring particularly to Fig. 50, it will be observed that the lower ends of the links 283 and 284 are pivotally mounted upon a cross shaft 285 rotatably secured in a bearing bracket 286 mounted upon the main table 1. The shaft 285 has rigidly secured thereto an upstanding lever 287, the upper end of which is formed with a notch 288 engageable with the cross shaft 282. It will be observed that the lever 287 is provided with an outstanding pin 289 connected by means of a spring 290 to one of a pair of stop bars 291—292 which are mounted upon an upstanding frame member 22 (as particularly shown in Fig. 40). The shaft 285 is also provided with a crank 293 connected by means of a link 294 to a rocker arm 295 pivoted upon the shaft 40 and having a roller 296 engaging a cam 297 on the secondary power shaft 153 so that as the secondary power shaft 153 is rotated to cut the serving of butter and to transfer the serving down upon the wrapping table 205, the paper transfer mechanism will be moved toward the knife 256 to receive the paper fed forwardly by the feed roller 254 immediately prior to the downward movement of the knife 256 to separate the section of paper. This forward movement of the paper carrier arms 280, 281 results from the interconnection of the lever 287 with the links 283, 284 by a cross bar 283a secured to both of the links 283—284 and having a pin 287a extending therethrough and secured to the lever 287, a spring 284a interposed between the pin and the cross bar so that the pin spring and cross bar constitute a yielding connection between the links 283—284 and the lever 287, thus permitting the lever 287 to be swung by its cam 297 through any desired arc but allowing the movement of the paper transfer mechanism to be definitely limited within accurate limits by means of adjusting stop screws 291a and 292a of the stop bars 291 and 292, respectively. Then the paper transfer mechanism will be moved back to the position shown in Fig. 51, drawing the cut length of paper onto the paper wrapping table prior to the placing thereon of the cut serving of butter by the transfer arms 230.

In order to insure the movement of the cut section of paper by the paper transfer mechanism, I provide a paper gripping frame 298 having a pair of forwardly extending arms 299—300 pivoted at 301 to the arms 280 and 281, the outer ends of the extending arms 299, 300 lying immediately above the outer ends of their respective arms 280, 281. The extending arms 299, 300 are preferably provided with spring-contact pieces 302 which, when the frame 298 is rotated down toward the arms 280, 281 will engage the paper and hold the same clamped to the arms 280, 281 during the cutting operation of the paper knife 256.

By referring particularly to Fig. 50, it will be observed that as the paper knife 256 descends an outstanding finger 303 thereon engages above the finger 299 and presses the same downwardly to grip the cut section of paper 304 at the instant the paper is cut. It will be noted that the paper gripping frame 298 has an outwardly extending finger 305 thereon engaged by a bow spring 306 so as to hold the paper gripping spring either in its downward position as shown in Fig. 50, or in its upper position as shown in Fig. 51. Thus during the return movement of the paper transfer mechanism the paper section 304 will be positively held on the paper transfer mechanism and will be moved thereby directly above the butter wrapping table 205.

By referring particularly to Figs. 45 and 46, it will be observed that the paper wrapping table 205 is provided with a pair of openings 307 through which a pair of pins 308 may be projected. The pins 308 are secured to a T-shaped bar 309 slidably mounted upon the T-shaped member 206 which supports the butter wrapping table 205. The bar 309 has a link 310 connected thereto, the opposite end of which is secured to a crank 311 rigidly mounted upon a shaft 312 (which constitutes the pivotal support for the T-shaped member 206), and which shaft is rigidly connected to the crank 207 by which the butter wrapping table 205 is lifted and lowered. It will be observed, however, that as the table 205 is raised and lowered the crank 311 will have oscillated slightly so that upon the downward movement of the butter wrapping table 205 the T-bar 209 will be drawn downwardly to the position shown in Fig. 46 withdrawing the pins 308 below the level of the table 205 while, when the table 205 is elevated to the position shown in Fig. 45, the pins 308 will be projected upwardly therethrough to engage the serving of butter as it is placed upon the table 205 by the transfer arms 230.

As hereinbefore described, the table 205 will be in its elevated position, as shown in Fig. 45, at the instant the serving of butter is laid thereon by the transfer arms 230 and, also as described hereinbefore, at that instant a cut length of butter will be lying immediately above the table 205 so that the butter will be laid thereon in the position shown in Fig. 42; that is, the serving of butter will be laid over one end of the cut length of paper 304 ready for the other end of the paper to be folded over the upper surface of the serving of butter.

This folding operation may be accomplished in any desired manner, though I have shown, in Figs. 42, 43 and 44 this folding operation as accomplished by a folding wire 313, one end of which is rigidly secured to a spool 314 rotatably mounted upon a pin 315 secured in the arm 216. The opposite end of the wire 313 is bent laterally to lie immediately below the cut strip of paper 304 when the spool 314 is moved to the position shown in Fig. 42. The spool 314 is provided with a downwardly projecting pin 316 which, in the position shown in Fig. 42, extends downwardly to be engaged by a trigger 317 mounted upon a stationary part of the machine. The spool 314 is moved to the position shown in Fig. 42 by means of a cord 318 wrapped therearound, one end of which is secured to a laterally bent arm of a rotatable shaft 319 connected as shown in Figs. 48 and 49 to a crank 320 which is in turn coupled by means of a link 321 to a rocker arm 322 pivoted upon the shaft 40 and having in its outer end a roller 323 engaging a cam 324 mounted upon the secondary power shaft 153. The arrangement of the cam 324 is such that immediately prior to the cutting of one of the servings of butter the shaft 319 will be rotated to draw the cord 318 downwardly and "cock" the folding wire 313 to the position shown in Fig. 42, where it lies immediately below the incoming cut length of paper 304. Now as the transfer arms 230 swing the cut section of butter down upon the table 205 the outer end of one of the transfer arms 230 will engage a vertically extending pin 325 resting upon the trigger 317 so that just as the butter serving is placed firmly upon the table 205 the trigger 317 will be pressed downwardly, releasing the spool 314, and allowing the folding wire 313 to snap to the position shown in Fig. 43, thus folding the extending end of the paper 304 over the top surface of the butter section 245. It will be observed that as the cut section of butter is laid upon the table and is pressed down thereon, the table 205 will have been moved to its uppermost position, as shown in Fig. 45, and will have its pins 308 projecting upwardly therefrom and as the serving of butter is placed down upon the table, it will engage the paper 304 and impale the same, as well as the butter serving, upon those pins. Thus while the paper transfer arms are still engaging the butter, the paper will be snapped across the top of the butter, the pins 308 preventing the paper from being displaced from below the butter during this operation.

By referring particularly to Fig. 44, it will be observed that the pin 315, upon which the spool 314 is mounted, is provided with a torsion spring 326 which normally urges the wire 313 to the position shown in Fig. 43 and against the force of which the spool must be turned by the drawing down of the cord 318.

After the butter has been wrapped, the butter serving 245', which is now resting upon the table 205 and which is now wrapped with the paper 304, is ready to be ejected from the machine and to accomplish this it is first necessary to withdraw the projections of the transfer arms 230 from their contact with the butter serving 245. It will be remembered that up to this time the two arms 230 will have been held clamped toward each other, engaging the butter serving by the locking bar 246. Since it is desirable that the release of the transfer arms 230 should not occur until after the butter has been wrapped, I provide upon the rack arm 264 an outwardly extending shelf 327, shown particularly in Figs. 50 and 51, which, when the transfer arms 30 are in their lowermost position,—that is, with a serving of butter on the wrapping table 205, will lie immediately below the extending end 328 of the rocking bar 246, which, prior to the separation of the transfer arms 230, will be in the position shown in dotted lines in Fig. 51. Thus during the single rotation of the secondary power shaft 153 to accomplish the last of the operations of the cutter 137, the paper cutting and folding operation, the lifting of the crank 262 and rocker arm 264 of the paper feeding mechanism, will cause the shelf 327 to press upwardly upon the locking bar 246, moving its slot away from the angle 248 and allowing the spring 329 to snap the transfer arms 230 apart. It will also be understood that this operation will occur at the time that the paper folding wire 313 is in the position shown in Fig. 43, thus pressing the butter serving down upon the table 205 and holding the same in place, while the projections 240 of the transfer arms are pulled away therefrom. By referring particularly to Fig. 51, it will be noted that upon the release of the transfer arms 230 and their separation, one of these arms 230 will engage a finger 298a and will rock the frame 298 and raise the paper holding springs 302 away from the paper transfer arms 280, thus preparing the paper transfer mechanism for its next movement toward the knife 256 to pick up the next cut section of paper. Immediately following this operation the paper wrapping table will be lowered from the position shown in Fig. 45 to the position shown in Fig. 46, by operation of the cam 214, and the linkage which connects the same with the table, and, as hereinbefore described, this lowering of the table 205 will withdraw the pins 308 down below the upper surface of the table, leaving the serving of butter free to be ejected therefrom. It will also be noted that at the same time that the table 205 is lowered the cam 324 will rotate the shaft 319 drawing the folding wire 313 away from the butter serving 245 so that the butter serving may be now engaged by suitable ejecting mechanism, and slid from the table 205. This ejecting mechanism is illustrated herein as an ejecting pusher 330 formed upon the end of a push rod 331 extending below and parallel with the secondary pusher rod 86 and having its rear end formed with a gear rack 332 meshed with a gear segment 333 to which is rigidly secured a pinion 334 engaged by a second gear rack 335 on a link 336 connected to the extreme outer end of the rocker arm 322. Thus as the butter serving 245' is released from the pins 308 and as the folding wire 313 is released therefrom, the push rod 331 will start its forward movement from the position shown in Figs. 42 and 43 and will press the serving butter to the position shown in Fig. 46.

By referring particularly to Fig. 43 it will be noted that the normal retracted position of the pusher 330 is such that it lies immediately below the extreme end of the paper 304 and when the butter table 205 is lowered the lowermost end of the paper 304 will engage the pusher 330 and as the pusher 330 starts its forward movement, the end of the paper 304 will be bent upwardly and pressed into neat folded relation over the end of the butter serving 245'. Also it will be noted that the pusher 330 is thus engaged, not with the plastic butter, but with the paper wrapper and there is no possibility of the butter adhering to the pusher.

It is well to note at this point that as shown in Fig. 49 the link 186 is employed to release the secondary pusher carriage 85 for its return movement upon the slicing of the last butter serving may be readily coordinated with the operations of the wire cutter 137, the wrapping and ejecting mechanism hereinbefore described by connecting the link 186 to the crank 320 which, as the crank is operated during the ejection of each of the butter servings, will draw the link 186 downwardly and hence upon the ejection of the last butter serving cut from a quarter-pound section (this ejecting operation being the last and final operation of the machine upon any given quarter-pound section), the lowering of the link 186 will, as hereinbefore described, engage and lower the pin 185 and release the secondary pusher 85.

The ejecting mechanism just described may eject the individual servings of butter, now wrapped in their individual papers 304, whence these servings may be taken, to any desired location and boxed or otherwise prepared for marketing. However, I have illustrated herein a carton-holding mechanism by which the ejecting apparatus may automatically press the individual butter servings into a previously prepared carton so that the machine will be completely automatic in its operations to divide a slab of butter into quarter-pound sections, slice each quarter-pound section into individual servings, wrap each individual serving, and finally actually package these individual servings into cartons. Since the machine as illustrated herein is adapted to slice quarter-pound sections into individual slices, it is desirable that each quarter-pound section, when sliced, be boxed in a carton designed to hold one-quarter pound of butter, as is more particularly illustrated and described in my copending application Serial No. 703,561, filed December 22, 1933.

If desired, the space below the main table 1 on my machine may be adapted for supporting and housing a suitable carton-folding mechanism, indicated generally by the reference character F, the operations of which may be coordinated with the fractionating, sub-dividing, wrapping and ejecting mechanisms hereinbefore described, by connecting the operating drive member 337 by means of a chain 338 to a sprocket 339 mounted upon and operable with the main power shaft 36 of the machine. In order to simplify the illustration and description of this application, it is not deemed necessary to describe in detail the carton-holding mechanism, other than to state that the finished carton, when folded, should lie immediately below the main table 1 so that an automatic serving of an empty carton in place of a full carton may be made as hereinafter described.

By referring particularly to Figs. 45 and 46, it will be noted that a carton-holding frame 340 is slidably mounted upon a carton carrier 341, as by means of securing a back plate 342 of the carton-holding frame to a rod 343 mounted for sliding movement in the carton carrier 341. During the operations of the machine to slice the quarter-pound sections of butter into individual servings, the carton-holder 340 is maintained in its vertical position, as shown in Figs. 45 and 46. As each individual serving of butter 245' is pressed by the pusher 330 into the carton 344, the carton-holder 340 should be lowered by just such distance as will allow the next serving of butter to slide into the carton immediately above the previously inserted serving.

I have illustrated in Figs. 45 and 46 the lowering of the carton-holder 340 in a step-by-step operation coordinated with the entrance of the butter servings 245 therein, as by means of a pawl 345 engageable with a plurality of ratchet teeth on a straight ratchet bar 346 secured to the back plate 342 of the carton-holding frame 340. The pawl 345 is pivotally mounted in the outer end of a rocker arm 347 pivoted as at 348 upon an upstanding bearing member 349 secured to the upper surface of the main table 1. The outer end of the rocker arm 347 overlies the shaft 312 which shaft is raised and lowered to raise and lower the butter wrapping table 205. Thus as the table 205 is lowered prior to the ejection of the serving of butter which has just been wrapped thereon, the pawl 345 will be raised upwardly to engage the next notch of the ratchet 346 and after that serving of butter, which has just been wrapped upon the table 205, is placed in the carton 344, the return upward movement of the table 205 to receive the next serving of butter is accompanied by a downward movement of the pawl 345 to pull the carton-holder 340 down one step to align the upper surface of the previously inserted butter serving with the lower surface of the next serving of butter to be pressed into place in the carton.

It will be noted that, from an inspection of Figs. 45 and 46, the butter serving as it leaves the table 205 will be pressed between a pair of guide plates 350 and 351, one above, one below the butter serving, so that the lowering of the carton holder 340 should be such as to align the upper surface of the previously ejected serving with the plate 351 on which the next serving of butter will ride as it passes into the carton.

The carton holder 340, having been drawn down one notch as the result of the entering of the first butter serving into the carton, will be held in this new position by means of a secondary pawl 352 normally pressed into engagement with the teeth of the ratchet 346 by means of a pawl holder 353 which is mounted upon the rocker arm 347 and is normally pressed by means of a spring 354 against the secondary pawl 352. It will be noted that the pawl 345 is also pressed toward the ratchet 346 by means of a relatively light spring 355.

The operation of the rocker arm 347 to lower the box will be repeated upon the cutting of each individual serving from the quarter-pound section until the entire quarter-pound section has been sliced and the individual serving has been pressed into the carton 344, at which time the carton holder 340 will be in its lowermost position.

As hereinbefore explained, the size of the carton 344 which is used should be selected as having dimensions but slightly in excess of the length, width, and thickness of the quarter-pound sections which are cut from the slab so that as each quarter-pound section is sliced into individual servings the carton will be of just such dimension as will accommodate the twelve individual slices.

After the quarter-pound carton has been filled with the individual slices, the carton may be ejected from the machine in any desired manner, such as by swinging the carton-holder from its vertical position, holding the carton on end with its open face toward the wrapping table 205, to a horizontal position with the open face of the carton uppermost as by mounting the carton carrier 341 upon the outer end of the arm 356 rigidly secured to a shaft 357 to which is secured a mutilated pinion 358 engaged by a gear rack 359 bound upon the end of a link 360 connected to a rocker arm 361 which has two branches, one of which is provided with a roller 362 riding upon a cam 363 and the other of which has a roller 364 riding upon a cam 365, the rocker arm being pivoted upon the shaft 40 and the cams 363 and 365 being rigidly secured to the main power shaft 36 so that after the quarter-pound section has been cut into its individual slices and the control of the machine transferred from secondary power shaft 153 back to main power shaft 36, the rotation of the power shaft 36 to cut the next fraction of butter from the slab will also cause the mutilated gear 358 to rotate shaft 357 from its vertical position, as shown in Figs. 45 and 46, to its horizontal position, as shown in Fig. 55.

By referring particularly to Fig. 55, it will be noted that when the carton holder is in its horizontal position the end of the carton is substantially aligned with a delivery table 366 onto which the filled carton may be ejected while a new carton is put in place in the holder 340. In the embodiment shown herein I have illustrated the carton-holding mechanism as terminating in a folded carton receiver 367 which holds a fresh carton in substantial alignment with the carton-holder 340 when the same is in its horizontal position, as shown in Fig. 55, though it will be understood that the carton receiver 367 may constitute the end of a trough into which previously folded cartons may be inserted and passed toward the carton holder 340 so that a carton transfer finger 368 may engage the interior of the next empty carton and press the same toward and into the carton holder 340, the entry of the fresh carton pressing the filled carton outwardly onto the delivery table 366. The carton transfer finger 368 may be coordinated in its movements with the lowering of the carton carrier 341 as by connecting the finger 368 to the end of the push bar 369 having a gear rack 370 formed thereon meshed with a gear 371 driven through a pinion 372 and a gear rack 373 connected to the outer end of a rocker arm 374 pivoted upon the shaft 40 and having a roller 375 thereon riding upon a cam 376 mounted upon the shaft 36.

I have illustrated the cam 376 as positively driving the carton transfer finger 368 forwardly, while a spring 377 is employed to retract the finger after its carton transfer operations are complete.

As hereinbefore explained, the empty carton should be in the uppermost position, as shown in Fig. 45, when the first of the butter servings is to be placed therein, the carton holder 340 being normally urged toward this uppermost position by means of a spring 378 engaging a sector gear 379 pivoted upon the shaft 357 and meshed with a pinion 380 rotatably mounted upon the arm 356 which supports the carton carrier 341, engaging a gear rack 381 secured to the back plate 342 of the carton holder 340 so that the spring 378 normally tries to draw the sector gear 379 downwardly against the stop pin 382. Thus the elevating pawl 345 will, upon its repeated operations, draw the carton holder 340 downwardly, causing the sector gear 379 to move away from the stop pin 382 against the force of the spring 378.

By mounting of the sector gear 379 upon the same shaft 357 about which the carton holder 341 rotates, it will be apparent that the sector gear, the pinion 380 and the gear rack 381 will be simultaneously swung together with the carton holder, without causing relative movement between these parts. However, after the carton has been filled and is swung down to its horizontal position, as shown in Fig. 55, the ratchet 346 should be released from the holding pawl 352 to allow the carton holder 340 to be again extended to the position aligning the lower end of the carton with the plate 351 ready to receive the first of the servings cut from the next quarter-pound section of butter. The release of the holding pawl 352 is accomplished by the initial swinging movement of the carton carrier 341 from its vertical position by carrying the holding pawl 352 which is mounted on the arm 356 and moves down with the carton carrier away from the pawl holder 353 by which the pawl 352 has previously been urged into engagement with the notches of the ratchet 346, whereupon a spring 383 lifts the holding pawl out of the teeth of the ratchet. The spring 378 will therefore be free to move, through the sector gear 379 and pinion 380, the carton holder 341 is swung back to its vertical position, causing the pawl 352 to reengage the lowermost notch in the ratchet 346.

It will be noted that the spring 383 is somewhat weaker than the spring 354 which urges the pawl holder 353 against the pawl 352 so that when the carton carrier 341 is in its vertical position the spring 354 will predominate and maintain the pawl in engagement with the rack 346.

In order to insure the accurate alignment of the carton carrier 341 in its vertical position, and also in its horizontal position, I provide a locking mechanism shown particularly in Figs. 57 and 58 engaging a sector 384 rigidly connected by an arm 385 to the shaft 357 which supports the carton carrier 341. The sector 384 is provided with a pair of notches extending from its lower surface, one of these notches 386 being engaged by pin 387 in the outer end of a bellcrank lever 388 when the carton holder 341 is in its vertical position, while the other notch 389 will engage the pin 387 when the carton holder 341 is in its horizontal position. The lever 388 may be normally urged into slot-engaging position by means of a spring 390 while the lever 388 may be moved out of notch-engaging position by the engagement with a pin 391 in the other arm thereof by a pair of outwardly extending pins or fingers 392 and 393 projecting radially from the driven clutch plate 128 so positioned upon the clutch plate 128 that at the initial start of the rotation of the shaft 36 the pin 392 will instantly move the bellcrank 388 to release the pin 387 from the notch 386, thus freeing the carton carrier for movement down toward the horizontal position, and as soon as it arrives at the horizontal position the notch 389 will engage the pin 387 holding the carton holder in the horizontal position until about ¾ths of a revolution has been accomplished by the shaft 36, whereupon the pin 393 on the clutch plate will move the bellcrank 388 again to again unlock the carton carrier 341, allowing the cams 363 and 365 to swing the carton carrier back to its elevated position. As soon as the carton carrier 341 arrives in its vertical position the notch 386 again engages the pin 387 and the carrier is held in the vertical position during the entire operation of the secondary power shaft 153 to slice the butter and package it in the carton.

It will therefore be observed that I have provided a unitary machine which will receive a slab of butter of not less than a predetermined weight and more or less predetermined dimensions, and which will accurately divide the slab of butter into equal fractions, each fraction containing not less than a predetermined weight of butter and then each fraction will be sliced into individual servings, individually wrapped, and packaged into cartons, each of which contains a complete fraction of said butter slab, and that all of the foregoing operations are accomplished automatically without the necessity of any manual handling of the machine or of the butter.

It will be understood by those skilled in the art that the fractionating portion of my machine may be operated as a single independent unit, and also that my subdivider, which operates to cut the quarter-pound sections of butter into individual servings, may also be operated as an independent unit, or the two units may be combined together in a single machine to perform their operations alternately.

While I have shown and described the preferred embodiment of my invention, it is to be understood that I do not wish to be limited to any of the details of construction shown herein, except as defined in the appended claims.

I claim:

1. In a commodity packaging machine, means for receiving a mass of a commodity having an approximate predetermined shape and an approximate predetermined size, means for dividing said mass evenly into a plurality of fractions thereof, means actuated by operation of said dividing means in dividing a fraction from said mass for subdividing each of said fractions into individual servings of said commodity, means for holding each individual serving while it is subdivided from said fraction and for conveying said subdivision to a wrapping table means associated with said wrapping table for wrapping each individual serving individually, and means for supporting a carton adjacent said wrapping table, and means operable across said wrapping table for placing a plurality of individual servings in a single carton.

2. In a commodity packaging machine, means for subdividing a mass of said commodity having an approximate predetermined size and shape into a plurality of individual servings by a series of cuts therethrough transversely to the longitudinal axis of said mass, including means for feeding said mass along the direction of its longitudinal axis in a series of successive steps and a cutter operable in a plane transverse to the longitudinal axis for severing an individual serving from said mass upon each of said feeding steps, wrapping means for wrapping each individual serving including a wrapping table, transfer means for engaging the end of said mass prior to the severance of each of said servings for transporting said servings from said cutter to said table, means for releasing said transfer means from said individual serving when said serving is deposited upon said table, and means for wrapping a paper about said serving on said table prior to the release of said transfer means.

3. In a commodity packaging machine, means for subdividing a mass of said commodity having an approximate predetermined size and shape into a plurality of individual servings by a series of cuts therethrough transversely to the longitudinal axis of said mass, including means for feeding said mass along the direction of its longitudinal axis in a series of successive steps and a cutter operable in a plane transverse to the longitudinal axis for severing an individual serving from said mass upon each of said feeding steps, wrapping means for wrapping each individual serving including a wrapping table, transfer means for engaging the end of said mass prior to the severance of each of said servings for transporting said servings from said cutter to said table, means for releasing said transfer means from said individual serving when said serving is deposited upon said table, means for wrapping a paper about said serving on said table prior to the release of said transfer means, said wrapping means including means for holding a paper wrapper on said table prior to the deposit of said individual serving thereon, a paper folder engageable below said paper near one end thereof, and means coordinated with the movements of said transfer means for actuating said folder to lift said end of said paper and to fold the same over a serving on said table.

4. In a commodity packaging machine, means for subdividing a mass of said commodity having an approximate predetermined size and shape into a plurality of individual servings by a series of cuts therethrough transversely to the longitudinal axis of said mass, including means for feeding said mass along the direction of its longitudinal axis in a series of successive steps and a cutter operable in a plane transverse to the longitudinal axis for severing an individual serving from said mass upon each of said feeding steps, wrapping means for wrapping each individual serving including a wrapping table, transfer means for engaging the end of said mass prior to the severance of each of said servings for transporting said servings from said cutter to said table, means for releasing said transfer means from said individual serving when said serving is deposited upon said table, means for wrapping a paper about said serving on said table prior to the release of said transfer means, and means for ejecting said wrapped serving from said paper wrapping table including a pusher mounted for movement across said table, and means operable after said wrapping operation is completed for moving said pusher to engage the same with the paper about one edge of said serving to move the same from said table.

5. In a commodity packaging machine, means for subdividing a mass of said commodity having an approximate predetermined size and shape into a plurality of individual servings by a series of cuts therethrough transversely to the longitudinal axis of said mass, including means for feeding said mass along the direction of its longitudinal axis in a series of successive steps and a cutter operable in a plane transverse to the longitudinal axis for severing an individual serving from said mass upon each of said feeding steps, wrapping means for wrapping each individual serving including a wrapping table, transfer means for engaging the end of said mass prior to the severance of each of said servings for transporting said servings from said cutter to said table, means for releasing said transfer means from said individual serving when said serving is deposited upon said table, means for wrapping a paper about said serving on said table prior to the release of said transfer means, means adjacent said wrapping table for supporting a carton on end, a pusher operable across said wrapping table for engaging said wrapped serving of commodity, and pressing the same into said carton, and means for lowering said carton upon the entry of each serving to align the upper surface of the last serving received therein with the lower surface of said pusher.

6. In a commodity packaging machine, means for subdividing a mass of said commodity having an approximate predetermined size and shape into a plurality of individual servings by a series of cuts therethrough transversely to the longitudinal axis of said mass, including means for feeding said mass along the direction of its longitudinal axis in a series of successive steps and a cutter operable in a plane transverse to the longitudinal axis for severing an individual serving from said mass upon each of said feeding steps, wrapping means for wrapping each individual serving including a wrapping table, transfer means for engaging the end of said mass prior to the severance of each of said servings for transporting said servings from said cutter to said table, means for releasing said transfer means from said individual serving when said serving is deposited upon said table, means for wrapping a paper about said serving on said table prior to the release of said transfer means, means adjacent said wrapping table for supporting a carton on end, a pusher operable across said wrapping table for engaging said wrapped serving of commodity, and pressing the same into said carton, and means for lowering said carton upon the entry of each serving to align the upper surface of the last serving received therein with the lower surface of said pusher, and means for ejecting a filled carton from said carton holder.

7. In a commodity packaging machine, means for subdividing a mass of said commodity having an approximate predetermined size and shape into a plurality of individual servings by a series of cuts therethrough transversely to the longitudinal axis of said mass, including means for feeding said mass along the direction of its longitudinal axis in a series of successive steps and a cutter operable in a plane transverse to the longitudinal axis for severing an individual serving from said mass upon each of said feeding steps, wrapping means for wrapping each individual serving including a wrapping table, transfer means for engaging the end of said mass prior to the severance of each of said servings for transporting said servings from said cutter to said table, means for releasing said transfer means from said individual serving when said serving is deposited upon said table, means for wrapping a paper about said serving on said table prior to the release of said transfer means, and means on said machine for feeding strips of paper to said wrapping table prior to the reception on said table of each individual serving.

8. In a commodity packaging machine, means for subdividing a mass of said commodity having an approximate predetermined size and shape into a plurality of individual servings by a series of cuts therethrough transversely to the longitudinal axis of said mass, including means for feeding said mass along the direction of its longitudinal axis in a series of successive steps and a cutter operable in a plane transverse to the longitudinal axis for severing an individual serving from said mass upon each of said feeding steps, wrapping means for wrapping each individual serving including a wrapping table, transfer means for engaging the end of said mass prior to the severance of each of said servings for transporting said servings from said cutter to said table, means for releasing said transfer means from said individual serving when said serving is deposited upon said table, means for wrapping a paper about said serving on said table prior to the release of said transfer means, paper feeding means including means supporting a roll of paper having a width in excess of twice the length of an individual serving, means for feeding paper from said supporting means over said wrapping table, and means for cutting individual lengths from said roll equal to the width of a serving of said commodity.

9. In a commodity packaging machine, means for subdividing a mass of said commodity having an approximate predetermined size and shape into a plurality of individual servings by a series of cuts therethrough transversely to the longitudinal axis of said mass, including means for feeding said mass along the direction of its longitudinal axis in a series of successive steps and a cutter operable in a plane transverse to the longitudinal axis for severing an individual serving from said mass upon each of said feeding steps, wrapping means for wrapping each individual serving including a wrapping table, transfer means for engaging the end of said mass prior to the severance of each of said servings for transporting said servings from said cutter to said table, means for releasing said transfer means from said individual serving when said serving is deposited upon said table, means for wrapping a paper about said serving on said table prior to the release of said transfer means, means adjacent said wrapping table for supporting a carton having interior dimensions substantially equal to the dimensions of said mass of said commodity before cutting, and means for pushing each individual serving into said carton successively whereby the subdivisions of the entire mass may be packaged in a single carton.

10. In a commodity packaging machine, means for subdividing a mass of said commodity having an approximate predetermined size and shape into a plurality of individual servings by a series of cuts therethrough transversely to the longitudinal axis of said mass, including means for feeding said mass along the direction of its longitudinal axis in a series of successive steps and a cutter operable in a plane transverse to the longitudinal axis for severing an individual serving from said mass upon each of said feeding steps, wrapping means for wrapping each individual serving including a wrapping table, transfer means for engaging the end of said mass prior to the severance of each of said servings for transporting said servings from said cutter to said table, means for releasing said transfer means from said individual serving when said serving is deposited upon said table, means for wrapping a paper about said serving on said table prior to the release of said transfer means, means adjacent said wrapping table for supporting a carton on end, a pusher operable across said wrapping table for engaging said wrapped serving of commodity, and pressing the same into said carton, means for lowering said carton upon the entry of each serving to align the upper surface of the last serving received therein with the lower surface of said pusher, and means adjacent said carton holder and operably responsive to movements thereon for engaging the ends of the paper wrapping of one serving in said carton to depress the same during the entry of the succeeding serving into said carton.

ARTHUR S. HEINEMAN.